United States Patent
Yamamura

(10) Patent No.: US 8,743,481 B2
(45) Date of Patent: Jun. 3, 2014

(54) LENS PLATE, LENS UNIT, EXPOSING APPARATUS, IMAGE FORMING APPARATUS, AND IMAGE READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 121 days.

(21) Appl. No.: 13/457,399

(22) Filed: Apr. 26, 2012

(65) Prior Publication Data

US 2012/0274993 A1 Nov. 1, 2012

(30) Foreign Application Priority Data

Apr. 26, 2011 (JP) ................................. 2011-098470

(51) Int. Cl.
*G02B 3/00* (2006.01)
*G02B 13/00* (2006.01)

(52) U.S. Cl.
CPC ............ *G02B 3/0056* (2013.01); *G02B 13/001* (2013.01)
USPC .......................................... 359/741; 359/739

(58) Field of Classification Search
CPC .... G02B 3/0006; G02B 3/0037; G02B 3/005; G02B 3/0056; G02B 13/001; G02B 13/0085
USPC .................................... 359/738, 739, 741, 796
See application file for complete search history.

(56) References Cited

U.S. PATENT DOCUMENTS

| 2,326,970 | A | * | 8/1943 | Rantsch | 353/38 |
|---|---|---|---|---|---|
| 7,382,534 | B2 | * | 6/2008 | Shinbo et al. | 359/456 |
| 7,515,357 | B2 | * | 4/2009 | Segawa et al. | 359/740 |
| 2004/0156130 | A1 | | 8/2004 | Powell et al. | |
| 2005/0002107 | A1 | | 1/2005 | Nemoto | |
| 2010/0002307 | A1 | * | 1/2010 | Yamamura | 359/626 |
| 2010/0073780 | A1 | * | 3/2010 | Ito | 359/793 |
| 2010/0177400 | A1 | | 7/2010 | Yamamura | |

FOREIGN PATENT DOCUMENTS

| JP | 2008-83576 | 4/2008 |
|---|---|---|
| JP | 2008-092006 A | 4/2008 |

* cited by examiner

*Primary Examiner* — Darryl J Collins
(74) *Attorney, Agent, or Firm* — Rabin & Berdo, P.C.

(57) ABSTRACT

A lens plate includes at least one lens row including a plurality of lenses aligned in a first direction, each lens including a lens surface that includes perimeter portions extending in a second direction substantially perpendicular to the first direction such that two adjacent lenses are contiguous with each other at the perimeter portions.

19 Claims, 22 Drawing Sheets

PR: PRINTED
NR: NOT PRINTED

LENS PLATE, LENS UNIT, EXPOSING APPARATUS, IMAGE FORMING APPARATUS, AND IMAGE READING APPARATUS

BACKGROUND OF THE INVENTION

1. Field of the Invention

The present invention relates to a lens plate, a lens unit, an exposing apparatus, an image forming apparatus, and an image reading apparatus.

2. Description of the Related Art

Existing electrophotographic image forming apparatus incorporate an exposing device for forming an electrostatic latent image on a photoconductive drum. One such exposing device is an LED head which irradiates the charged surface of the photoconductive drum with light emitted from LED arrays using an optical system. Scanners and facsimile machines employ an optical system that forms an image on an image capturing section in which a plurality of light receiving element arrays are arranged.

The optical system includes a plurality of micro lenses aligned substantially in a straight line, the lenses forming an erect image of unity magnification with high resolution. One such optical system is disclosed in Japanese Patent Publication No. 2008-92006. This publication discloses a lens array in which a plurality of lenses are aligned in two adjacent rows such that the distance between the optical axes of adjacent lenses in each of the two adjacent rows is L1. Further, a micro lens in one of the two adjacent rows is between two adjacent micro lenses in the other of the two adjacent rows, and the distance between the optical axes of the two adjacent lenses is L2. The distance L1 is longer than the distance L2.

In order to improve the resolution of an electrostatic latent image, the size of LEDs in the LED head must be reduced to increase the density of dots of light. Decreasing the size of LEDs causes light output of individual LEDS to decrease. Thus, the light emitting efficiency of individual LEDs needs to be improved. In addition, the light generating efficiency of the light source must be improved in order to reduce power consumption.

SUMMARY OF THE INVENTION

An object of the invention is to provide a lens plate in which lenses are densely arranged to increase the resolution thereof.

A lens plate includes at least one lens row includes a plurality of lenses aligned in a first direction. Each lens includes a lens surface that includes perimeter portions. The perimeter portions extend in a second direction substantially perpendicular to the first direction such that two adjacent lenses are contiguous with each other at the perimeter portions.

A lens unit incorporates two lens plates. The lens unit includes a light blocking member including openings that extends therethrough. The two lens plates and the light blocking member are assembled together such that the optical axis of each lens passes through a corresponding one of the openings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Preferred embodiments will be described with reference to the accompanying drawings. The drawings should be used for understanding the invention and are not intended to limit the scope of the invention.

First Embodiment

Configuration

Figure 1:
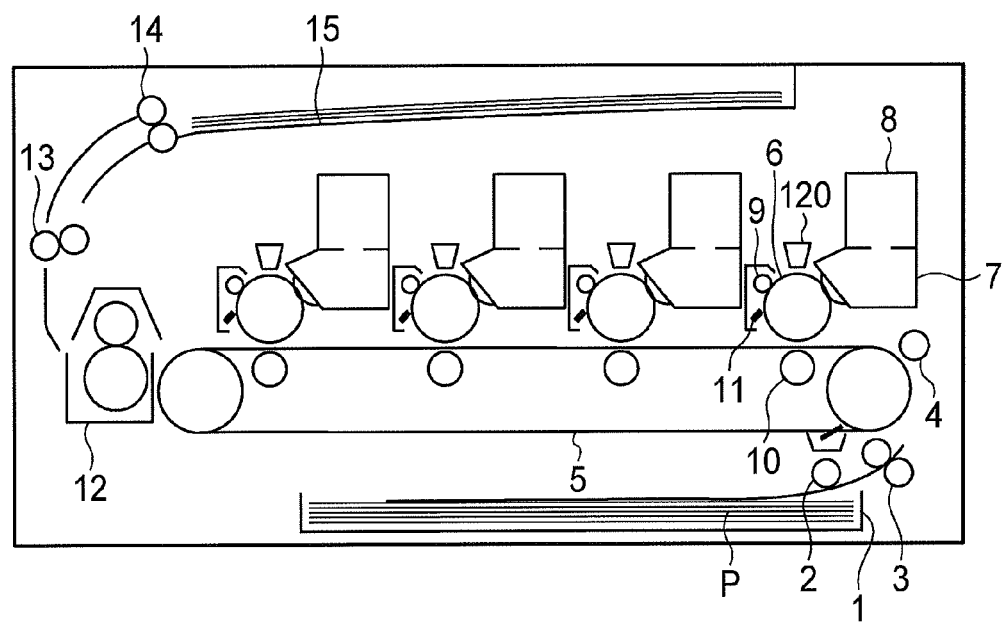
FIG. 1 illustrates an image forming apparatus according to a first embodiment.

FIG. 1 illustrates an image forming apparatus according to a first embodiment of the invention.

The image forming apparatus is, for example, an electrophotographic color printer. The electrophotographic color printer forms a full color image on a print medium (e.g., paper) in accordance with the image data. The image is formed using developer materials (e.g., toner) T formed of a resin material that contains pigments as colorants.

A paper cassette 1 is disposed at a lower part of the image forming apparatus, and holds a stack of paper P therein. A feed roller 2 is urged by a spring (not shown) against the top sheet of the stack of paper P. Transport rollers 3 and 4 are disposed downstream of the feed roller 2 with respect to the direction of travel of the paper P, and transport the paper P, advanced by the feed roller 2, to a transfer belt 5.

A plurality of image forming sections for forming yellow, magenta, cyan, and black images are aligned along and over a transport path of the paper P. The image forming sections are identical in structure and differ only in the color of toner. FIG. 1 illustrates the four image forming sections with only the most upstream one given reference characters.

Each image forming section includes an electrostatic latent image bearing body (e.g., photoconductive drum) 6, a developing unit 7 that develops the electrostatic latent image formed on the photoconductive drum 6 with the toner T, and a toner cartridge 8 that supplies the toner T of a corresponding color to the developing unit 7.

A charging roller 9 is disposed in contact with the photoconductive drum 6. An exposing unit (e.g., LED head) 120 is disposed above the photoconductive drum 6 and irradiates the charged surface of the photoconductive drum 6 with light in accordance with image data.

A transfer section is disposed under the plurality of photoconductive drums 6. The transfer section includes the transfer belt 5 that transports the paper P and a plurality of transfer rollers 10 disposed to hold the transfer belt 5 in a sandwiched relation between the photoconductive drums 6 and the transfer rollers 10. The transfer section transfers a toner image onto the paper P carried on the transfer belt 5.

A cleaning blade 11 is disposed in contact with the photoconductive drum 6, and removes the toner T remaining on the surface of the photoconductive drum 6 after transferring the toner image onto the paper P.

A fixing unit 12 is disposed downstream of the transfer section, which fixes the toner image on the paper P by heat and pressure. A transport roller 13 and a discharge roller 14 are located downstream of the fixing unit 12. The transport roller 13 transports the paper P that has passed the fixing unit 12. The discharge roller 14 discharges the paper P onto a stacker 15 that holds sheets of paper having an image formed thereon.

A power supply (not shown) applies voltages to the charging rollers 9 and transfer rollers 10. A motor (not shown) drives the transfer belt 5, photoconductive drum 6, rollers 1, 2, 3, 4, 9, 12, 13, and 14 in rotation via gear trains. The developing unit 7, LED heads 120, fixing unit 12, and motors (not shown) are connected to a power supply and a control section (not shown). The control section performs a function for controlling the overall operation of the image forming sections. The control section receives print data via an interface (I/O) from a host apparatus.

Figure 2:
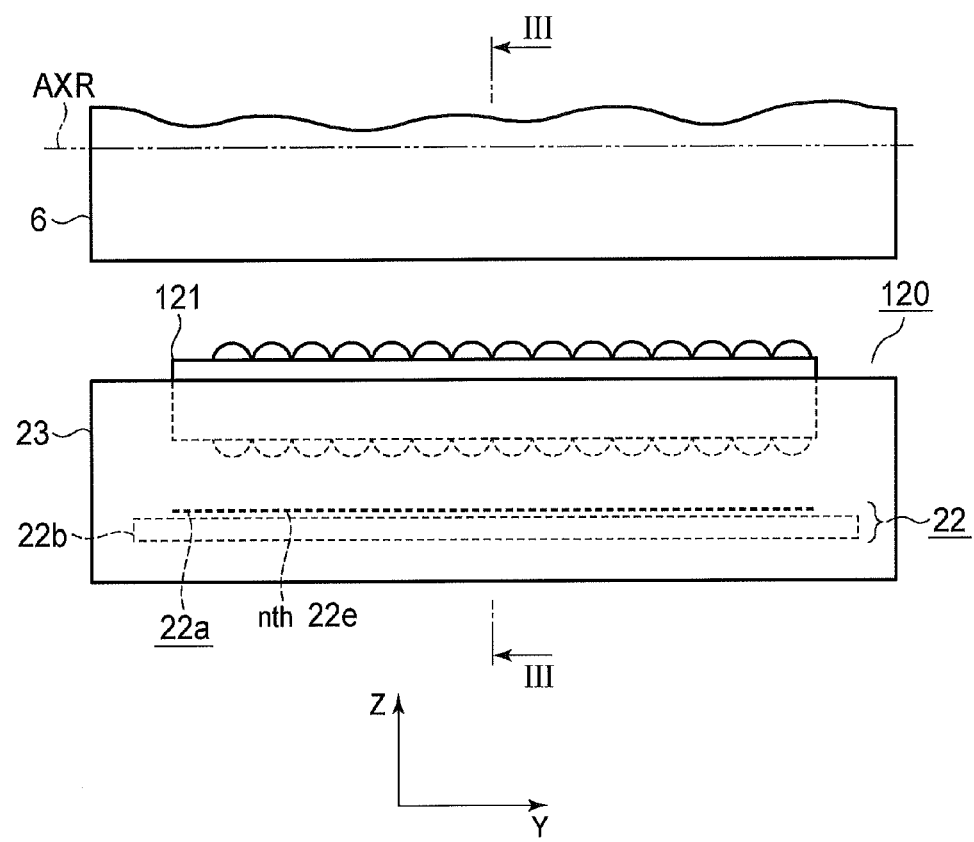
FIG. 2 illustrates the outline of a photoconductive drum and an LED head shown in FIG. 1.

FIG. 2 illustrates the outline of the photoconductive drum 6 and LED head 120 shown in FIG. 1. The LED head 120 includes a lens unit 121 disposed to face the photoconductive drum 6, a light emitting section 22, and a holder 23. The lens unit 121 is held together by the holder 23. The light emitting section 22 includes an LED array 22a in which a plurality of LEDs 22e are aligned substantially in a straight line, and a driver integrated circuit (driver IC) 22b that drives the LEDs 22e.

The lens unit 121 extends in a longitudinal direction (Y direction) substantially parallel to the LED array 22a. The lens unit 121 includes a plurality of micro lenses 131a whose optical axes extend in directions (Z direction) perpendicular to the longitudinal direction.

The photoconductive drum 6 is rotatable on its axis of rotation AXR, and extends in the Y direction substantially parallel to the longitudinal direction of the lens unit 121.

Figure 3:
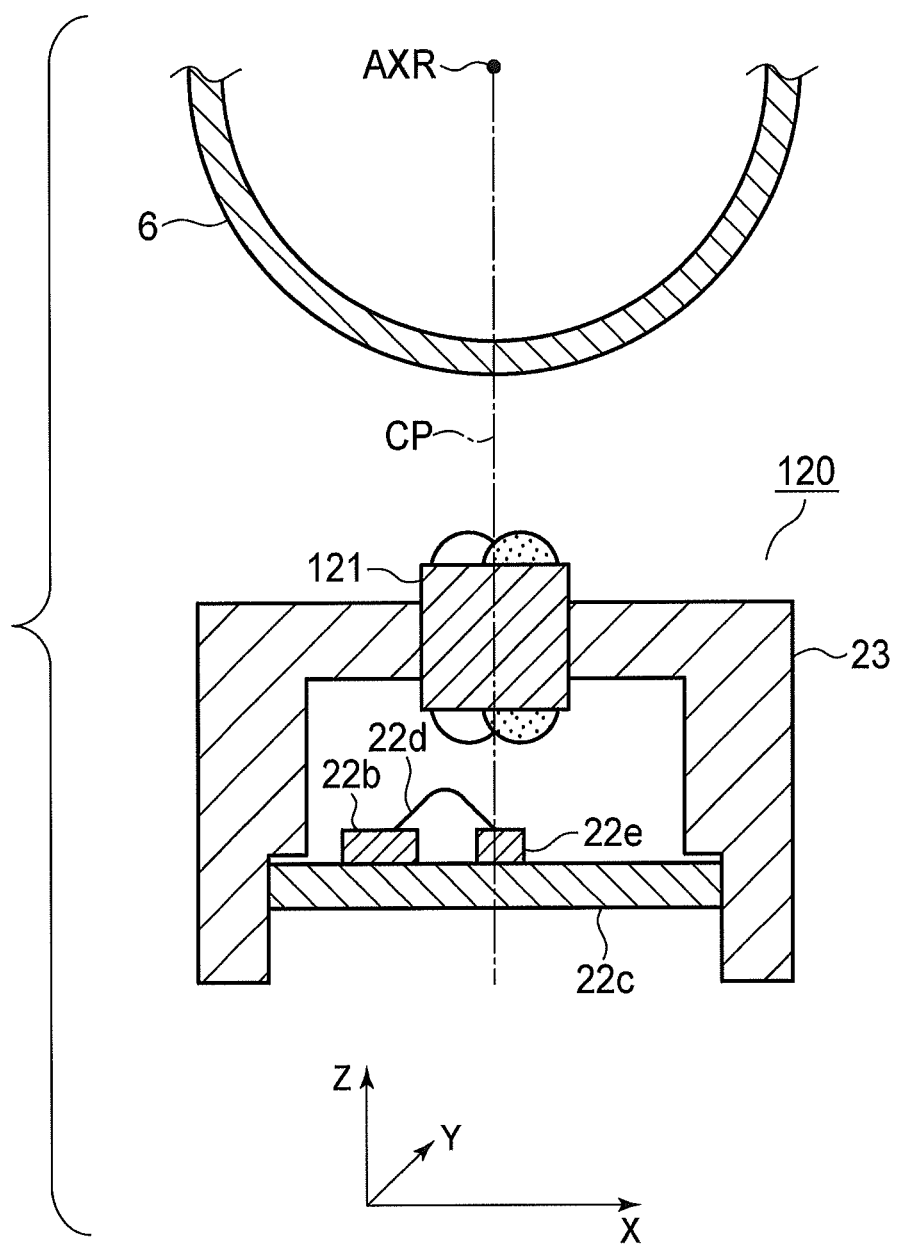
FIG. 3 is a cross-sectional view taken along a line in FIG. 2.

FIG. 3 is a cross-sectional view taken along a line in FIG. 2. The width of the lens unit 121 extends in a direction (X direction) perpendicular to the longitudinal direction (Y direction) and the optical axes (Z direction) of the micro lenses. The LEDs 22e are aligned substantially in a direction parallel to a longitudinal centerline CL (FIG. 5) of the lens unit 121, and lying in a plane CP (FIG. 3) that divides the width of the lens unit 121 in half. The LEDs 22e and driver IC 22b are disposed on a wiring board 22c, and are connected via wires 22d.

In the first embodiment, the LED head 120 has a resolution of 1200 dpi, i.e., 1200 LEDs 22e per inch. In other words, the LEDs 22e are arranged at 0.02117 mm intervals.

Figure 4:
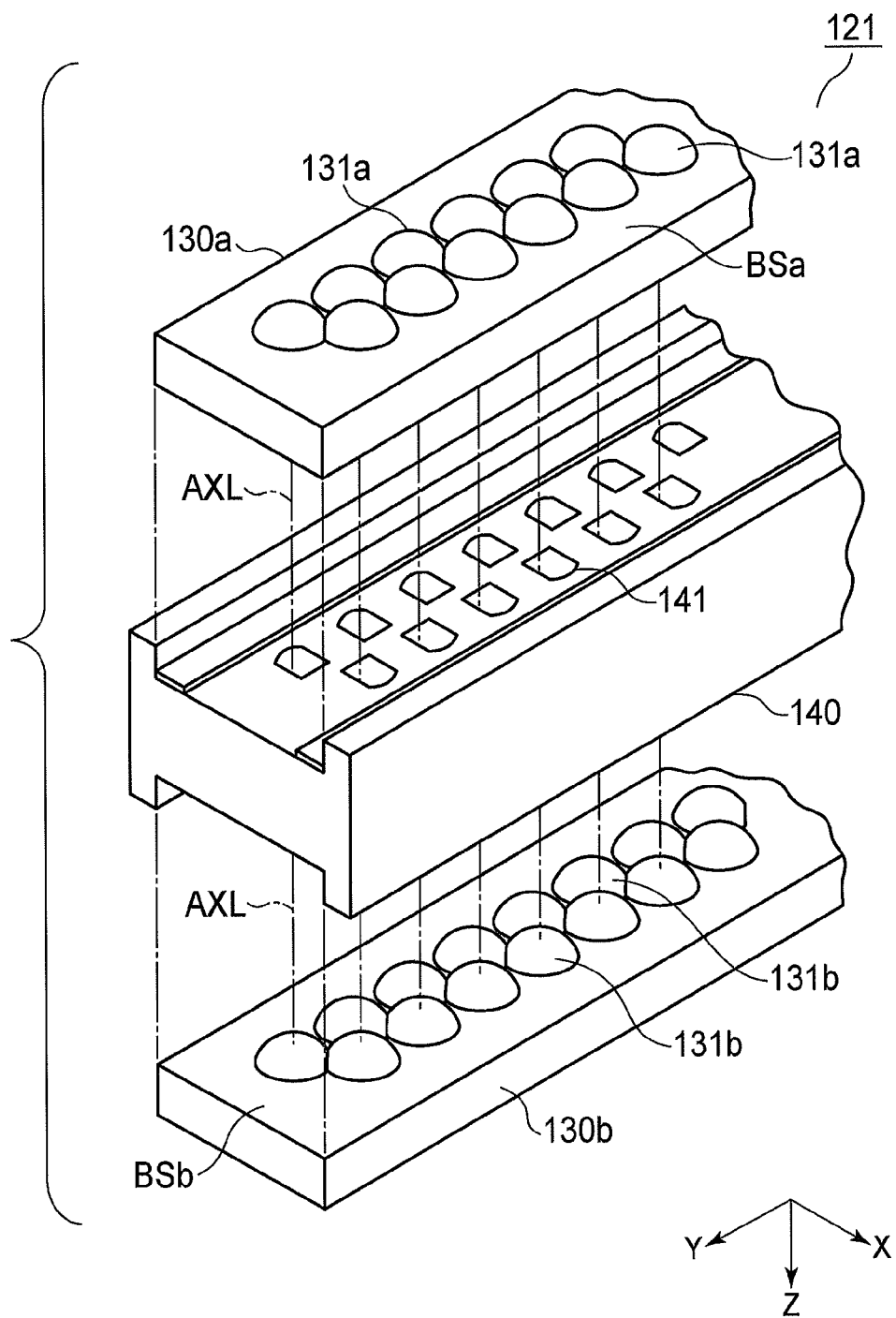
FIG. 4 is an exploded perspective view illustrating the lens unit.

FIG. 4 is an exploded perspective view illustrating the lens unit 121. The lens unit 121 includes a lens plate (e.g., lens array) 130a, a lens plate (e.g., lens array) 130b, and a light blocking member 140. The light blocking member 140 is sandwiched between the lens plate 130a and the lens plate 130b, the lens plate 130a directly facing the LEDs 22e and the lens plate 130b directly facing the photoconductive drum 6.

The lens plate 130a includes a base BSa and a plurality of micro lenses 131a formed in a single piece construction with the base BSa. The lens plate 130b includes a base BSb and a plurality of micro lenses 131b formed in a single piece construction with the base BSb.

The micro lenses 131a and 131b are aligned at regular intervals such that the optical axes AXL of the micro lenses 131a are in line with those of the micro lenses 131b and extend in a direction shown by arrow Z. The light blocking member 140 has openings 141 formed therein at the same regular intervals as the micro lenses 131a and 131b so that the optical axes AXL pass through the openings 141. The openings 141 serve as an aperture.

Figure 5:
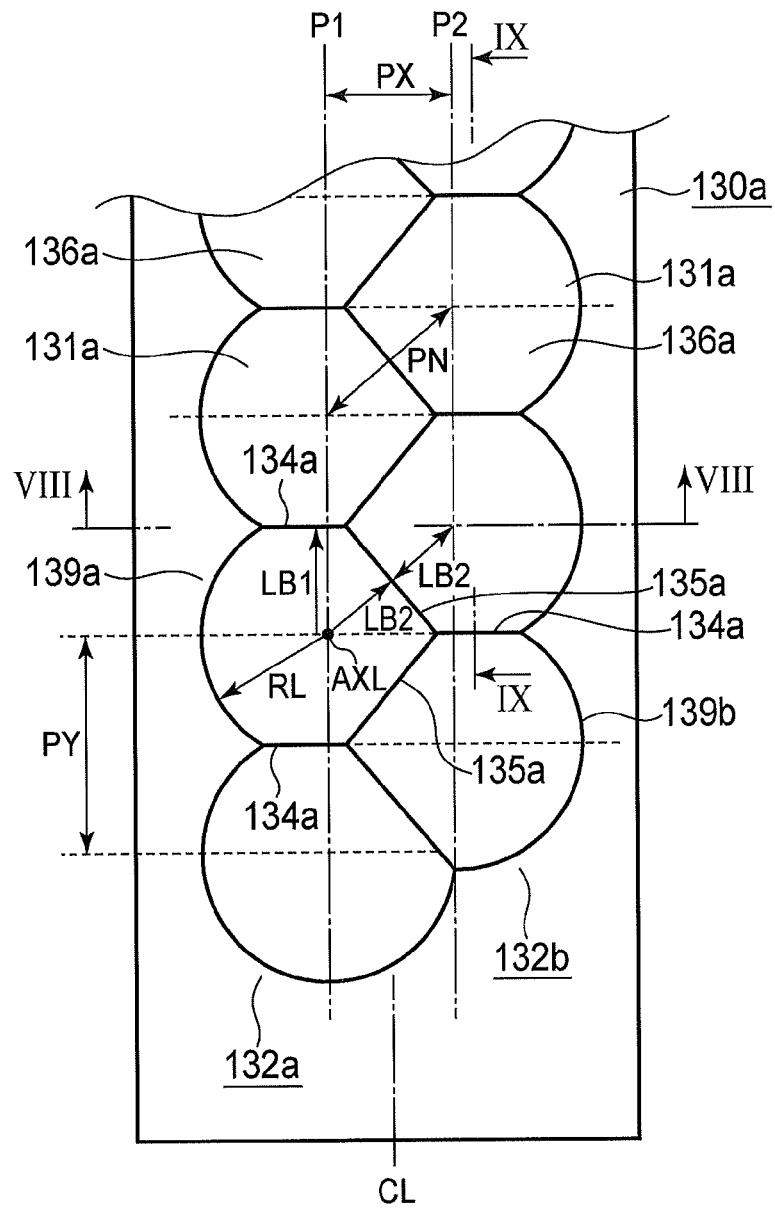
FIG. 5 is a top view illustrating the lens plate shown in FIG. 4.

FIG. 5 is a top view illustrating the lens plate 130a shown in FIG. 4. The lens plate 130a has a lens row 132a and a lens row 132b extending in straight parallel directions. The lens rows 132a and 132b include micro lenses 131a aligned with a center-to-center distance PY such that the optical axes AXL of the micro lenses 131a of each row lie in one of two parallel planes P1 and P2 spaced apart by a distance PX. The two parallel planes are substantially parallel with the longitudinal direction of the lens plate 130a.

Each micro lens 131a has two straight perimeter portions 134a extending in a direction substantially normal to the plane P1 in which the optical axes of the micro lenses 131a lie, so that one of adjacent micro lenses 131a in the lens row is contiguous with the other of the adjacent micro lenses 131a at the straight perimeter portions 134a. The distance LB1 between the optical axis AXL of a micro lens 131a and each of the straight perimeter portions 134a of the micro lens 131a and the lens radius RL of a circumferential perimeter portion of the micro lens 131a are related as follows:

$$RL > LB1$$

$$LB1 = PY/2$$

Thus, the lens surface includes a circumferential perimeter portion 139a at a distance (RL) from the optical axis AXL, the distance RL being longer than a half (LB1) of the distance between the optical axes AXL of the two adjacent lenses. PY is a distance between the optical axes of two adjacent lenses in one of the two adjacent lens rows.

The micro lenses 131a in the lens rows 132a and 132b further have two straight perimeter portions 135a that meet at their ends to form an angle with each other. The lens row 132a and 132b are staggered by half the center-to-center distance PY such that a micro lens 131a in one of the lens row 132a and the lens row 132b is between two adjacent micro lenses 131a in the other, and is contiguous with the two adjacent micro lenses 131a at the two straight perimeter portions 135a. In other words, each lens plate includes two rows of micro lenses 131a arranged into an overlapping nested configuration in which each micro lens 131a in one of the two rows extends into adjacent two micro lenses 131a in the other of the two rows with their perimeter portions in intimate contact with each other.

A micro lens 131a in one of the two lens rows 132a and 132b is contiguous with a micro lens 131a in the other of the two lens rows 132a and 132b such that the optical axes of these two micro lenses 131a are spaced apart by a distance PN.

Each of the two straight perimeter portions 135a pass through the distance PN, dividing the distance PN in two halves, i.e., LB2 and LB2 such that RL>LB2 where LB2 is the distance between the optical axis AXL of a micro lens 131a and the one of the two straight perimeter portions 135a, and RL is a lens radius of the micro lens 131a or the distance between the circumferential perimeter of the micro lens 131a and the optical axis AXL thereof (i.e., the radius of the micro lens 131a). It can also be said that the distance LB2 is a half of a distance between the optical axis of the first lens in one of the two adjacent lens rows and the optical axis of the second lens in the other of the two adjacent lens rows.

The above-described arrangement of the micro lenses 131a provides uniform properties of the micro lenses 131a.

The configuration of the lens plate 130b is substantially the same as that of the lens plate 130a.

The lens plates 130a and 130b are formed of a material transparent to light. In the first embodiment, the lens plates 130a and 130b are injection-molded from, for example, a plastic which is a cycloolefin resin ZEONEX E48R available from Japan Zeon. The light blocking member 140 is injection-molded from, for example, polycarbonate which is not transparent to light.

The micro lenses 131a and micro lenses 131b have an aspheric surface with rotational symmetry given by Equation (1) as follows:

$$Z(r) = \frac{r^2}{Cnm + \sqrt{1 - \left(\frac{r}{Cnm}\right)^2}} + Anm r^4 + Bnm r^6 \qquad \text{Eq. (1)}$$

where Z(r) is the curvature as a positive value with the vertex or top of the micro lens 131a or 131b located at the origin, the curvature extending in a direction from the object plane OP (FIG. 9) of the lens unit 121 toward the image plane IP (FIG. 9), r is a rotating coordinate system having the optical axis AXL located at a rotating axis such that $r=(X^2+Y^2)^{1/2}$, X and Y are directions shown in, for example, FIG. 5, Cnm is a radius of curvature, Anm is an aspheric surface fourth coefficient, Bnm is an aspheric surface sixth coefficient, n=1 indicates the micro lens 131a, n=2 indicates the micro lens 31b, m=1 indicates a lens surface 136a directly facing the object plane OP, and m=2 indicates a lens surface 136b directly facing the image plane IP. For example, All represents an aspheric surface fourth coefficient of the lens surface of the micro lens 131a directly facing the object 51. Likewise, A22 represents as aspheric surface fourth coefficient of the micro lens surface of the micro lens 131b directly facing the image plane IP.

Figure 6:
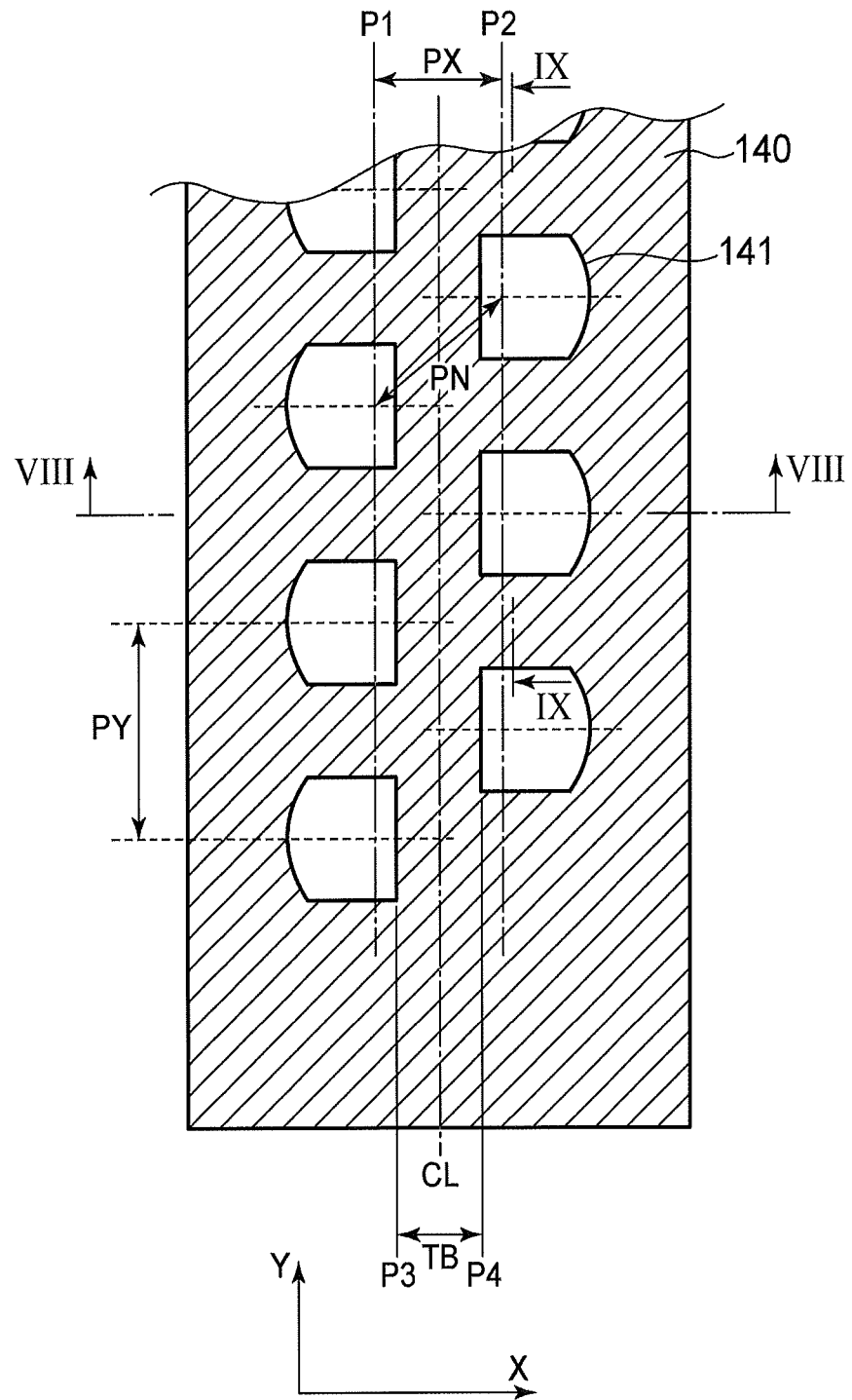
FIG. 6 is a top view of a light blocking member shown in FIG. 4.

FIG. 6 is a top view of the light blocking member 140 shown in FIG. 4. The light blocking member 140 has two parallel rows of a plurality of openings 141 formed therein, the openings 141 being aligned in a longitudinal direction in which the light blocking member 140 extends. The openings 141 are formed at regular center-to-center intervals PY (center to center distance or distance between the optical axes) such that each opening 141 is in alignment with corresponding micro lenses 131a and 131b. The plane 21 in which the optical axes AXL of the micro lenses 131a in the lens row 132a lie passes through the openings 141 in one of the two parallel rows of openings 141. The plane P2 in which the optical axes AXL of the micro lenses 131a in the lens row 132b lie passes through the openings 141 in the other of the two parallel rows of openings 141. These two planes 21 and P2 are spaced apart by a distance PX. The optical axis that passes through an opening 141 in one of two parallel rows of openings 141 is located between the optical axes that pass through two adjacent openings 141 in the other of the two parallel rows of openings 141. A distance PN is the distance between the optical axis passing through the opening in one of the two parallel rows of openings and the optical axis passing through one of the two adjacent openings in the other of the two parallel rows of opening 141. Each opening 141 has a smaller opening area on a side of the plane P1 or P2 closer to the longitudinal center line CL than on a side of the plane closer to the widthwise end of the light blocking member 140. Openings 141 each have a straight perimeter portion lying in one of planes P3 and P4 that are parallel to the planes P1 and P2. These two planes P3 and P4 are spaced apart by a distance TB.

Figure 7:
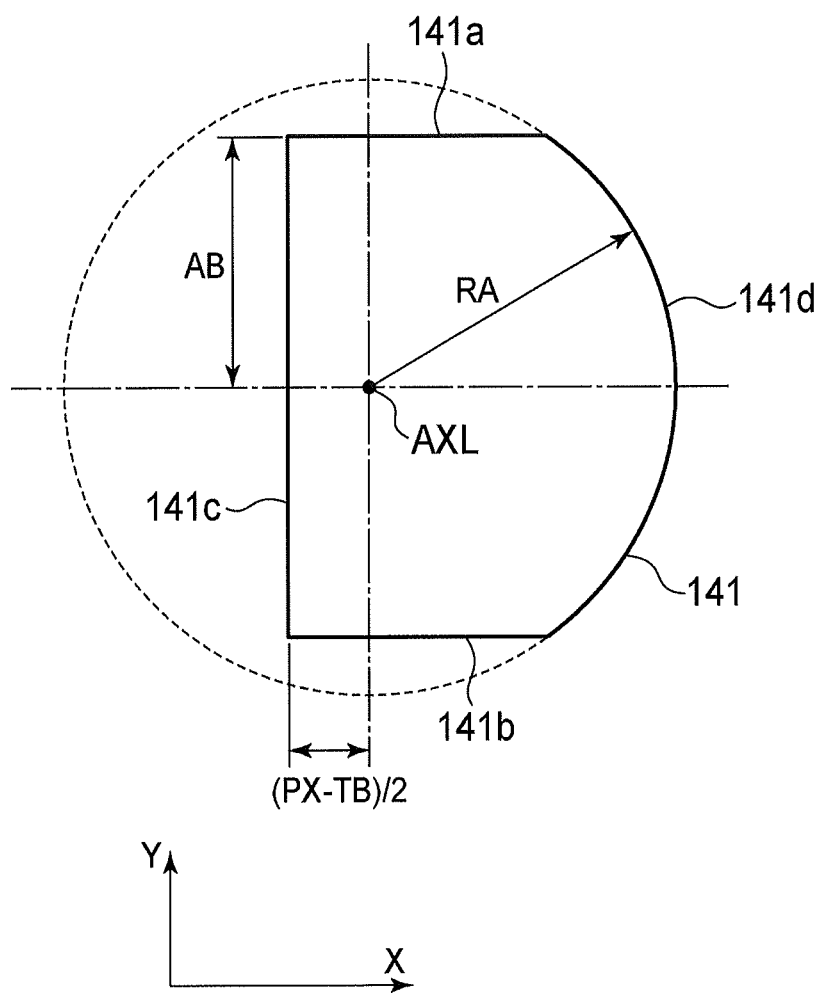
FIG. 7 is an expanded view of an opening shown in FIG. 6.

FIG. 7 is an expanded view of the opening 141 shown in FIG. 6. The opening 141 has a circumferential perimeter portion 141d, two parallel straight perimeter portions 141a and 141b extending in directions substantially perpendicular to the longitudinal direction (Y direction) or the planes P1 and P2, and a single straight perimeter portion 141c extending in a direction substantially parallel to the longitudinal direction or lying in the plane P1 or plane P2. Each of the straight perimeter portions 141a and 141b is spaced apart by a distance AB from the optical axis AXL, and the single straight perimeter portion 141c is spaced apart by (PX-TB)/2 from the optical axis AXL. The circumferential perimeter portion 141d is a part of a circumference having a radius of RA, and is at a longer distance from the optical axis than a half of the distance PN. The radius RA of the circumferential perimeter portion 141d is equal to or smaller than the lens radius RL of a circumferential perimeter portion of the micro lens 131a. If the lens plate is bonded to the light blocking member 140 with some positional errors, the light may enter areas of the lens plate except the surface of micro lenses, causing poor contrast. For this reasons, the radius RA may be advantageously smaller than the lens radius RL.

Figure 8:
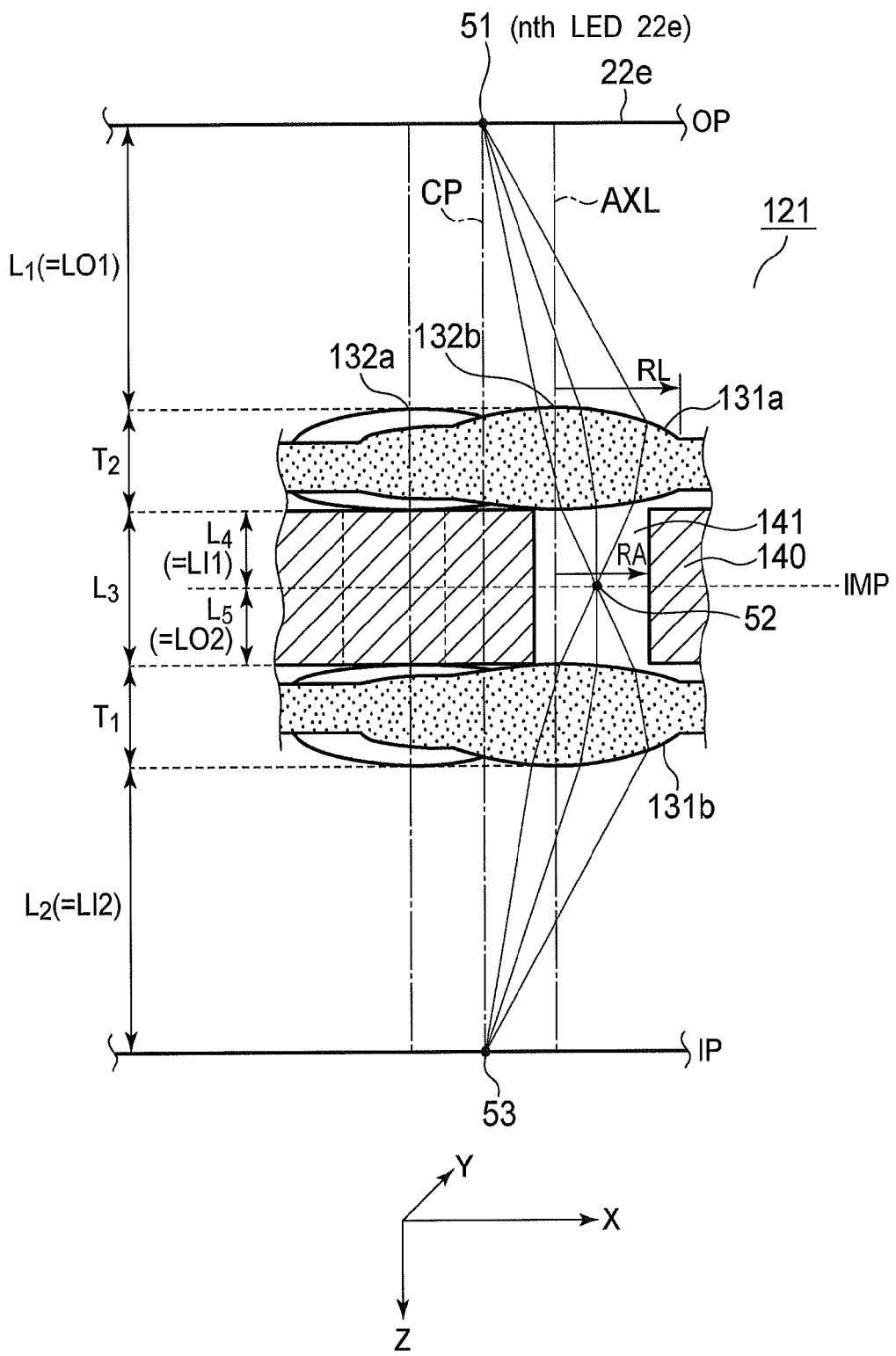
FIG. 8 is a partial cross-sectional view taken along a line VIII-VIII in FIG. 5 and a line VIII-VIII in FIG. 6.

The radius RA is larger than the distance AB. The lens unit 121 will be described in detail. FIG. 8 is a partial cross-sectional view of the lens unit 121 taken along a line VIII-VIII in FIG. 5 and a line VIII-VIII in FIG. 6, illustrating the lens unit 121 cut in a plane in which the optical axes AXL of the micro lenses 131a lie.

The object plane OP is located a distance L1 from the micro lenses 131a. The image plane IP is located a distance L2 from the micro lenses 131b. The LEDs 22e are located in the object plane OP. The micro lenses 131a and the micro lenses 131b are spaced apart by a distance L3, and the optical axes AXL of the micro lenses 131a and 131b are in line with each other.

The micro lens 131a has a thickness T2 and forms an intermediate image 52 of an object 51, the intermediate image 52 being formed in an intermediate image plane IMP located a distance L4 from the micro lens 131a. The micro lens 131b has a thickness T1 and forms an erect image 53 of the intermediate image 52 in the image plane IP.

Suppose that an object is placed in front of the lens surface 136a of a single micro lens 131a. The distance L01 and LI1 are related such that when an object is placed in an object plane spaced a distance L01 from a first lens surface 136a of the micro lens 131a, the micro lens 131a forms an image in an image plane spaced a distance LI1 from a second lens surface 136a opposite to the first lens surface 136a. In FIG. 8, L1, L4, L01, and LI1 are related such that L1=L01, and L4=LI1. Likewise, suppose that an object is placed in front of the first lens surface 136a of the single lens micro lens 131b. The distance LI2 and L02 are related such that when an object is placed in an object plane spaced a distance L02 from the first lens surface, the micro lens 131a forms an image in an image plane spaced a distance LI2 from the second lens surface 136a of the micro lens 131b. In FIG. 8, L2, L5, LI2, and L02 are related such that L5=L02, and L2=LI2.

The micro lenses 131a and micro lenses 131b may have the same configuration. In other words, both the micro lenses 131a and 131b may have the thickness T1 (=T2). The micro lenses 131a and 131b may be disposed such that one of the micro lenses 131a and 131b is a mirror image of the other with respect to the image plane IMP lying substantially a midway between the micro lenses 131a and the micro lenses 131b. The intermediate image plane IMP may be located such that the distance L4 between the intermediate image plane IMP and the micro lenses 131a is equal to the distance L5 between the intermediate image plane IMP and the micro lenses 131b. Likewise, the distance L2 between the image plane IP and the micro lenses 131b may be equal to the distance L1 between the object plane OP and the micro lenses 131a.

Figure 9:
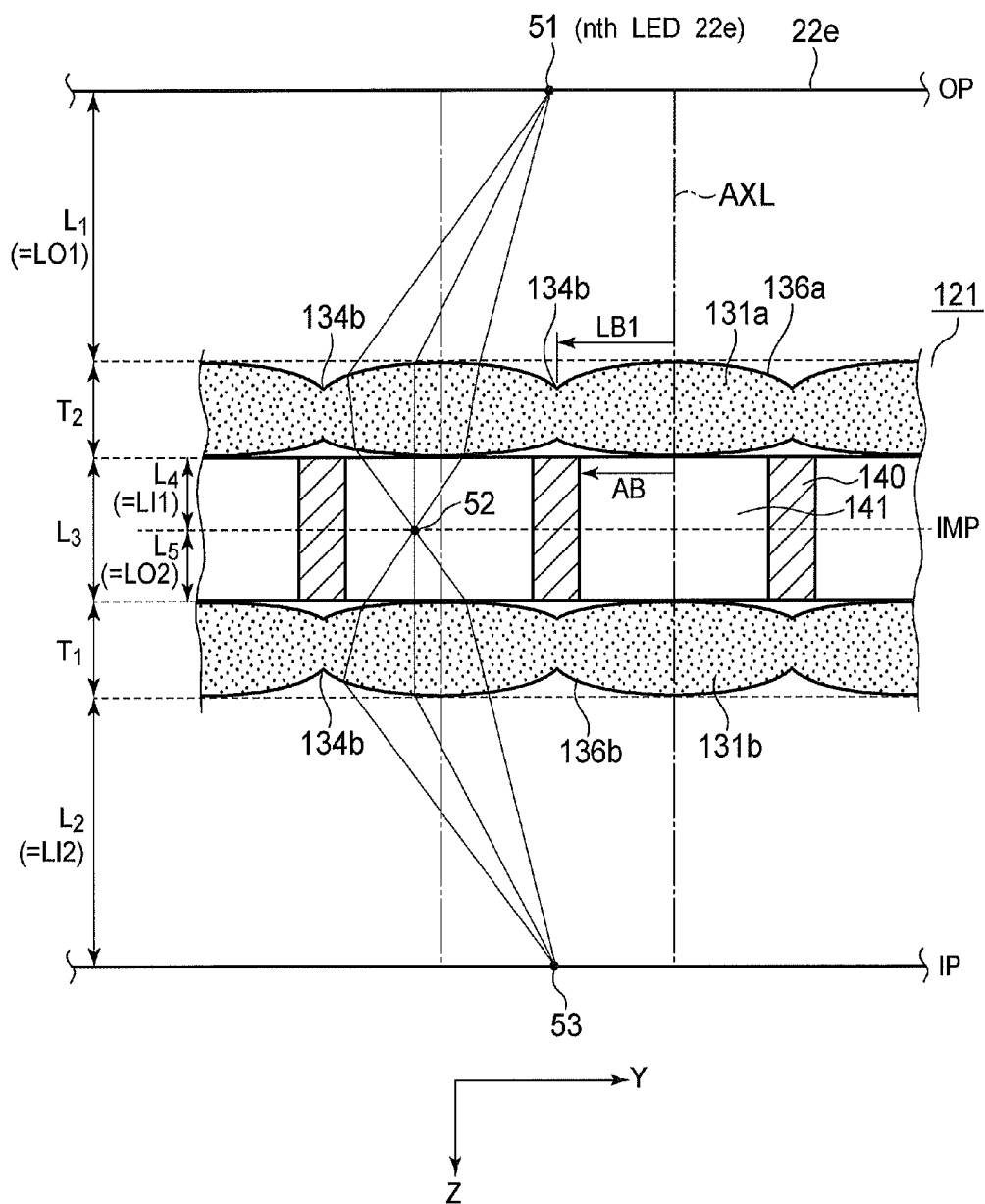
FIG. 9 is a partial cross-sectional view of the lens unit taken along a line IX-IX in FIG. 5 and a line IX-IX in FIG. 6.

FIG. 9 is a partial cross-sectional view taken along a line IX-IX in FIG. 5 and a line IX-IX in FIG. 6.

The nth LED 22e is located substantially in the plane CP that divides the width of the lens unit 121 in half, and in which a longitudinal centerline CL of the lens unit 121 lies. The LEDs 22e are aligned substantially in a straight line substantially parallel to the longitudinal center line CL. Therefore, the distance between the nth LED 22e and the lens row 132a is equal to that between the nth LED 22e and the lens row 132b.

A description will now be given of the dimensions of the lens unit 121 of the invention and those of a comparative example. Table 1 lists the dimensions of the lens unit 121 of the invention and those of a comparative example. It is to be noted that the comparative example has a lens radius RL equal to a distance LB1, i.e., the micro lenses of the comparative example have no straight perimeters 134a but adjacent micro lenses are contiguous. This implies that the micro lenses 131a of the lens unit 121 have a larger lens radius RL than the micro lenses of the comparative example, which permits a larger amount of light to pass through the lens surface 136a and hence a brighter image. The lens unit of the comparative example has the same configuration as the lens unit 121 except for the lens radius RL and aperture diameter RA. The micro lenses of the comparative example have the same shape as those of the lens unit 121 of the invention, and are disposed such that the micro lenses of one of the two lens plates are mirror images of the other of the two lens plates with respect to the image plane IMP.

TABLE 1

| DIMENSION | UNIT | FIRST EMBODIMENT | COMPARATIVE EXAMPLE |
|---|---|---|---|
| PN | mm | 0.6931 | 0.6931 |
| PX | mm | 0.48 | 0.48 |
| PY | mm | 1.0 | 1.0 |
| RL | mm | 0.6 | 0.5 |
| LB1 | mm | 0.5 | 0.5 |
| LB2 | mm | 0.3466 | 0.3466 |
| RA | mm | 0.6 | 0.5 |
| AB | mm | 0.3 | 0.3 |
| TB | mm | 0.24 | 0.24 |
| C11 | mm | 0.81686 | 0.81686 |
| A11 | | −0.17295 | −0.17295 |
| B11 | mm | −0.15587 | −0.15587 |
| C12 | mm | −1.80198 | −1.80198 |
| A12 | | 0.32002 | 0.32002 |
| B12 | | 0.85214 | 0.85214 |
| C21 | mm | −0.81686 | −0.81686 |
| A21 | | 0.17295 | 0.17295 |
| B21 | | 0.15587 | 0.15587 |
| C22 | mm | 1.80198 | 1.80198 |
| A22 | | −0.32002 | −0.32002 |
| B22 | | −0.85214 | −0.85214 |
| L1 | mm | 2.74 | 2.74 |
| T1(=T2) | mm | 1.2 | 1.2 |
| L3 | mm | 3.02 | 3.02 |

Operation of Image Forming Apparatus of First Embodiment

The operation of the image forming apparatus according to the first embodiment will be described with reference to FIG. 1.

The feed roller 2 is urged by a spring (not shown) against the top sheet of the stack of paper P held in the paper cassette 1. The feed roller 2 feeds the paper P into a transport path on a sheet-by-sheet basis. The paper P is then transported to the vicinity of the transfer belt 5.

A plurality of image forming sections for forming yellow, magenta, cyan, and black images, respectively, are aligned above the transfer belt 5 along the transport path of the paper P.

The charging roller 9 receives a high voltage from a power supply (not shown), and charges the surface of the photoconductive drum 6. The photoconductive drum 6 rotates so that the charged surface passes under the LED head 120. The LED head 120 illuminates the charged surface in accordance with image data to form an electrostatic latent image. As the photoconductive drum 6 further rotates, the developing unit 7 develops the electrostatic latent image with a developer material into a developer image or toner image.

As the photoconductive drum 6 further rotates, the toner image arrives at a transfer point defined between the photoconductive drum 6 and the transfer belt 5 where the toner image is transferred onto the paper P.

As the transfer belt 5 runs, the paper P is transported to the fixing unit 12 where the toner image on the paper P is fused by heat and pressure into a permanent image. The paper P is further transported by the transport roller 13 and discharge roller 14 to the stacker 15. This completes the operation of the image forming apparatus.

{Operation of LED Head}

The operation of the LED head 120 will be described with reference to FIGS. 2 and 3.

A controller (not shown) sends a control signal to the LED head 120, causing the LED head 120 to emit light. The driver IC 22c shown in FIG. 3 receives the control signal, and then selectively drives the LEDs 22e to emit light in accordance with the control signal. The light emitted from the LEDs 22e passes through the lens unit 121 to form an electrostatic latent image on the photoconductive drum 6.

{Operation of Lens Unit}

The operation of the lens unit 121 will be described with reference to FIG. 9.

The light emitted from the nth LED 22e or object 51 enters the micro lens 131a which in turn forms an intermediate image 52 in the intermediate image plane IMP. The intermediate image 52 is an inverted, de-magnified image. The inverted, de-magnified image enters the micro lens 131b which in turn forms an inverted image or an erect image of unity magnification in the image plane IP. The principal rays of the light, which are emitted from all points in the object plane OP and pass in the vicinity of the optical axis AXL, are parallel in the area between the micro lenses 131a and the micro lenses 131b, i.e., a telecentric system. When light is emitted from an object, the light diverges into a light beam in the shape of a cone. The light beam passes through a lens and converges into a conical shape toward the image plane IP. Principal ray is a center of the light beam.

If all the LEDs 22e of the LED array 22a are energized to emit light, the intermediate image 52 is formed all across the intermediate image plane IMP in the openings 141. The light that does not contribute to the formation of an image in the image lane IP is blocked by the light blocking plate 140.

The lens plates 130a and 130b may be different in configuration, in which case the lens unit 121 can also forms an erect image of unity magnification. The light emitted from the object 51 or the nth LED 22a enters the micro lens 131a so that the micro lens 131a forms an intermediate image 52 at a distance L4 from the micro lens 131a. The light from the intermediate image 52 enters the micro lens 131b which in turn forms an erect image of unity magnification, 53, in the image plane IP. For the lens plates 130a and 130b having different shapes, the light components of the light, which are emitted from all points in the object plane OP and pass in the vicinity of the optical axis AXL, are also parallel in the area between the micro lenses 131a and the micro lenses 131b, i.e., a telecentric system.

The lens unit 121 will now be described with reference to FIG. 8. The light emitted from the nth LED 22e, located on the longitudinal center line CL of the lens unit 121, enters areas of the lens surface 136a of the micro lens 131a closer to the widthwise end of the lens unit 121 than the optical axis AXL, the micro lens 131a forming an image of the nth LED 22e in the intermediate image plane IMP on a side of the optical axis AXL opposite the longitudinal center line CL.

The micro lens 131b forms in the image plane IP the erect image 53 of the intermediate image 52, the erect image 53 having a unity magnification and being located on the center line CL of the lens unit 121.

It is to be noted that the lens unit 121 is configured such that the light emitted from the object 51 or the nth LED 22e passes through a space between the micro lens 131a and the micro lens 131b closer to the outer widthwise edge of the lens unit 121 than the optical axis AXL. Therefore, the amount of light that contributes to formation of the intermediate image increases with increasing lens radius RL of the micro lens 131a. It is also to be noted that the adjacent micro lenses 131a in the lens row are contiguous with each other at the straight perimeter portions 134a. In order to increase the distance LB1, the distance PY must be increased. Increasing the distance PY decreases the number of the micro lenses 131a aligned in the longitudinal direction, causing the decrease in light power—hence the decrease in the resolution of an image.

The lens radius RL of the micro lenses 131a and 131b larger than the distance LB1 allows a larger amount of light to enter the micro lenses 131a and 131b in the present invention than in the conventional lens array, thereby providing images with higher intensity.

The lens unit 121 is configured such that the light emitted from the object 51 passes through a space between the micro lens 131a and the micro lens 131b closer to the outer widthwise edge of the lens unit 121 than the optical axis AXL. This implies that the amount of light passing through the lens increases with increasing radius RA of the opening 141 shown in FIG. 7. On the other hand, the openings 141 are closely arranged, if the distance AB of the opening 141 is to be increased, the intervals PY must be increased. It is to be noted that the openings 141 are aligned with the center-to-center distance equal to the PY. Therefore, increasing PY decreases the number of the micro lenses 131a per unit distance in the direction of alignment of the micro lenses 131a, which in turn causes the amount of light passing through the micro lenses 131a and hence resolution of image.

Thus, selecting the radius RA of the opening 141 larger than the distance AB as shown in FIG. 7 allows a larger amount of light to enter the micro lenses 131a than the conventional lens arrays, forming a bright image.

Advantages of LED Head According to First Embodiment

Modulation transfer function (MTF) of a lens was measured that indicates the resolution of the image formed by the lens. Measurement was made for both an LED head that utilize the lens unit 121 of the invention and an LED head that utilizes a lens array of the comparative example. For both the lens units or arrays, the measured MTF was 95%. The MTF indicates the contrast of a formed image of the nth LED 22e of the LED head. An MTF of 100% indicates that the contrast of a formed image is at its maximum and therefore the LED head has high resolution. The contrast of a formed image decreases with decreasing MTF—hence the resolution of the formed image.

MTF is defined as follows:

$$MTF = \frac{EMAX - EMIN}{EMAX + EMIN} \times 100 \quad (2)$$

where EMAX is a maximum value of the profile of the amount of light of the formed image of two adjacent objects, and EMIN is a minimum value of the profile of the amount of light of two adjacent formed images.

Measurement of MTF was made as follows: The image was formed at a position in the image plane IP a distance L2 away from the vertex of the micro lens 131b, and was photographed using a microscope digital camera. The distribution of the amount of light was then analyzed, and the MTF was then calculated. The LED head used in the measurement had LEDs 22e aligned at intervals of PD=0.02117 m. The measurement was made with either odd numbered LEDs 22e or even numbered LEDs 22e energized.

The brightness of the formed image was measured for the LED head 120 that incorporates the lens unit 121 of the invention and the LED head that incorporates the lens unit of the comparative example. The brightness of the LED head 120 according to the invention was 1.13 times higher than that of the LED head of the comparative example. The image formed at a position in the image plane IP, a distance L2 away from the vertex of the micro lens 131b, was photographed using a microscope digital camera. The distribution of the amount of light was then analyzed, and finally the maximum value EMAX of the amount of light of the formed image was determined.

In the first embodiment, the RL, LB1, and RA are selected such that RL>LB1 and RA≤RL, thereby increasing the amount of light passing through the lens to form a bright image. A large LB1 causes aberration which in turn decreases the contrast of an image, i.e., a blurred image.

Advantages of Image Forming Apparatus According to First Embodiment

Figure 10:
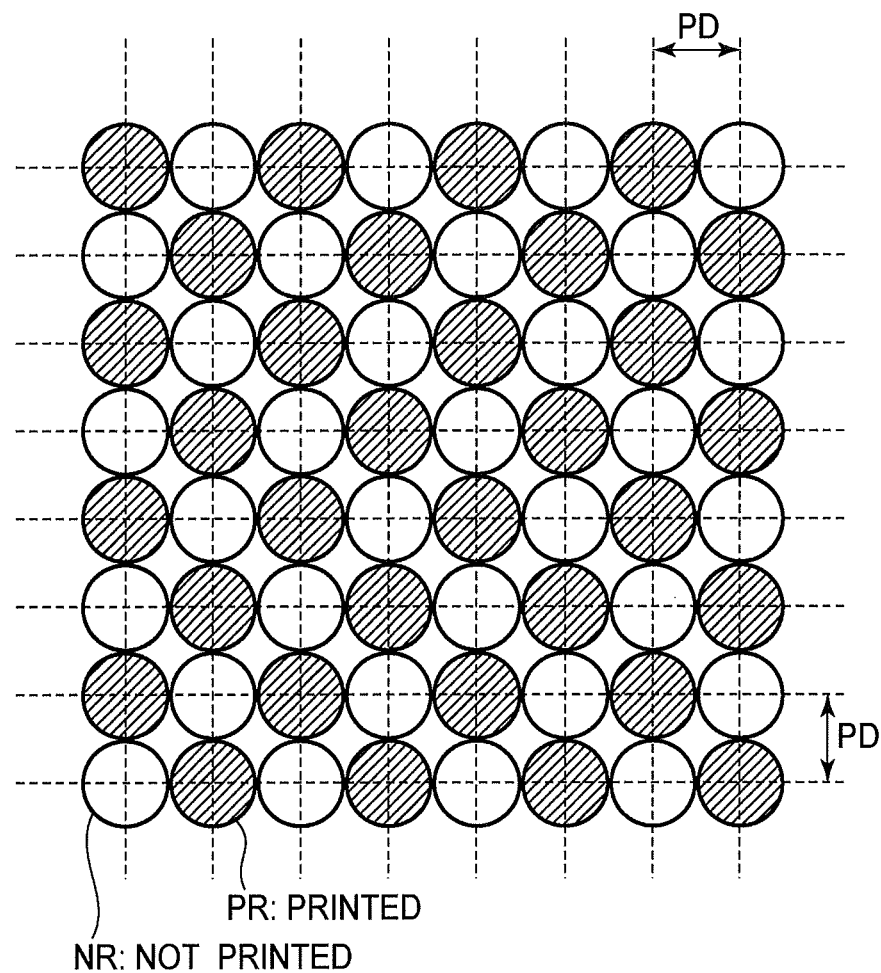
FIG. 10 is a partial expanded view, illustrating dots printed on the entire printable area of a print medium.

FIG. 10 is a partial expanded view, illustrating dots printed on the entire printable area of a print medium. Black dots indicate printed dots and white dots indicate non-printed dots.

Images were printed using a color LED printer that incorporates the lens unit 121 according to the first embodiment and a color LED printer that incorporates the lens array according to the comparative example. Good images were obtained for both color printers without white streaks and uneven density.

Dots are printed at intervals of PD=0.02117 mm and with a resolution of 12000 dpi. Dots are printed such that a dot in one of two adjacent rows is positioned between two consecutive dots in the other of the two adjacent rows. Evaluation of the images revealed that image quality was good.

Advantages of First Embodiment

The lens radius RL of the micro lenses 131a and 131b is larger than the distance LB1 of the micro lenses 131a and 131b, which increases the amount of light entering the micro lenses 131a and 131b—hence higher resolution.

The LED head 120 according to the first embodiment incorporates the lens unit 121. Thus, even if the amount of light emitted from the LED 22e decreases over time, the amount of light exiting the micro lenses 131a and 131b is still sufficient to form a bright image.

The image forming apparatus according to the first embodiment incorporates the lens unit 121, providing printed image with high resolution and quality.

Second Embodiment

Configuration

The image forming apparatus according to a second embodiment has substantially the same configuration as that of the first embodiment. The configuration of an LED head 220 and a lens unit 221 according to the second embodiment will be described below. The lens plate 230a has substantially the same configuration as the lens plate 230b and therefore the lens plate 230a will be described mainly for simplicity.

Figure 11:
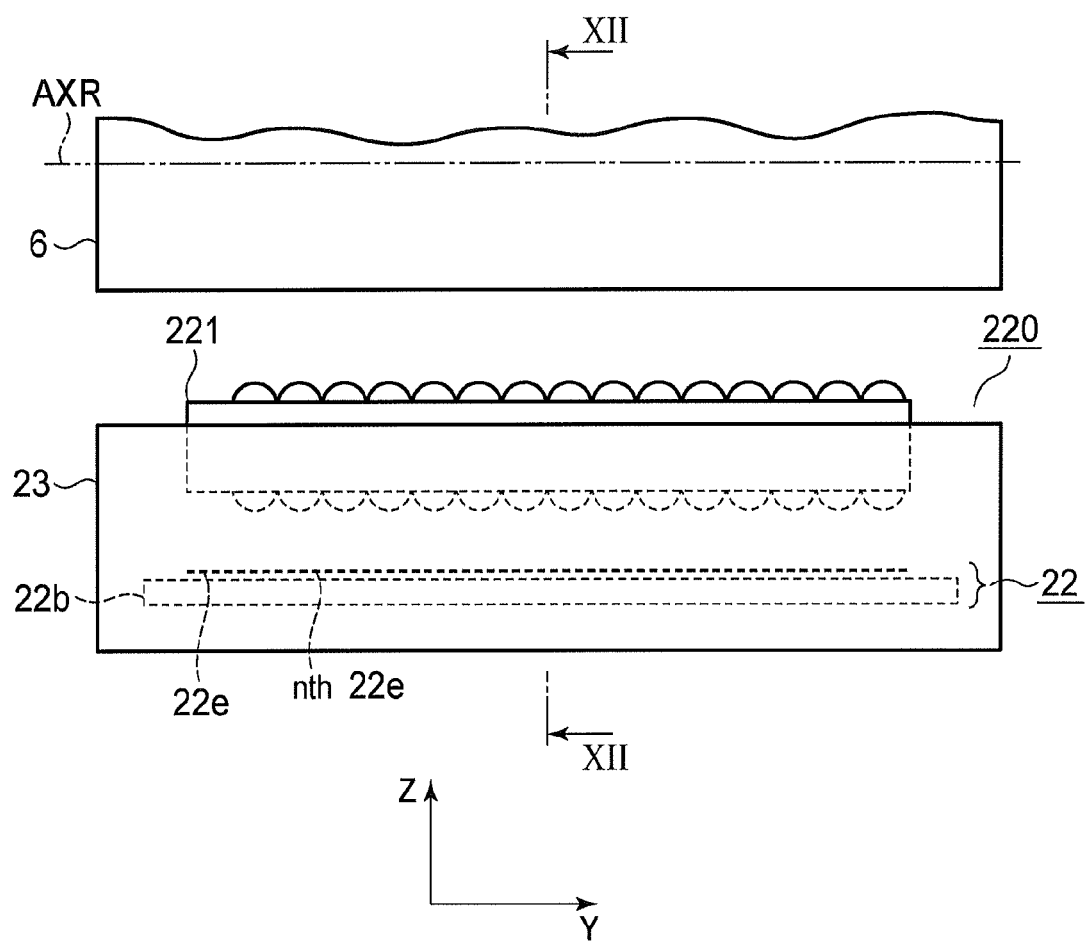
FIG. 11 illustrates the outline of a photoconductive drum and LED head of a second embodiment.
Figure 12:
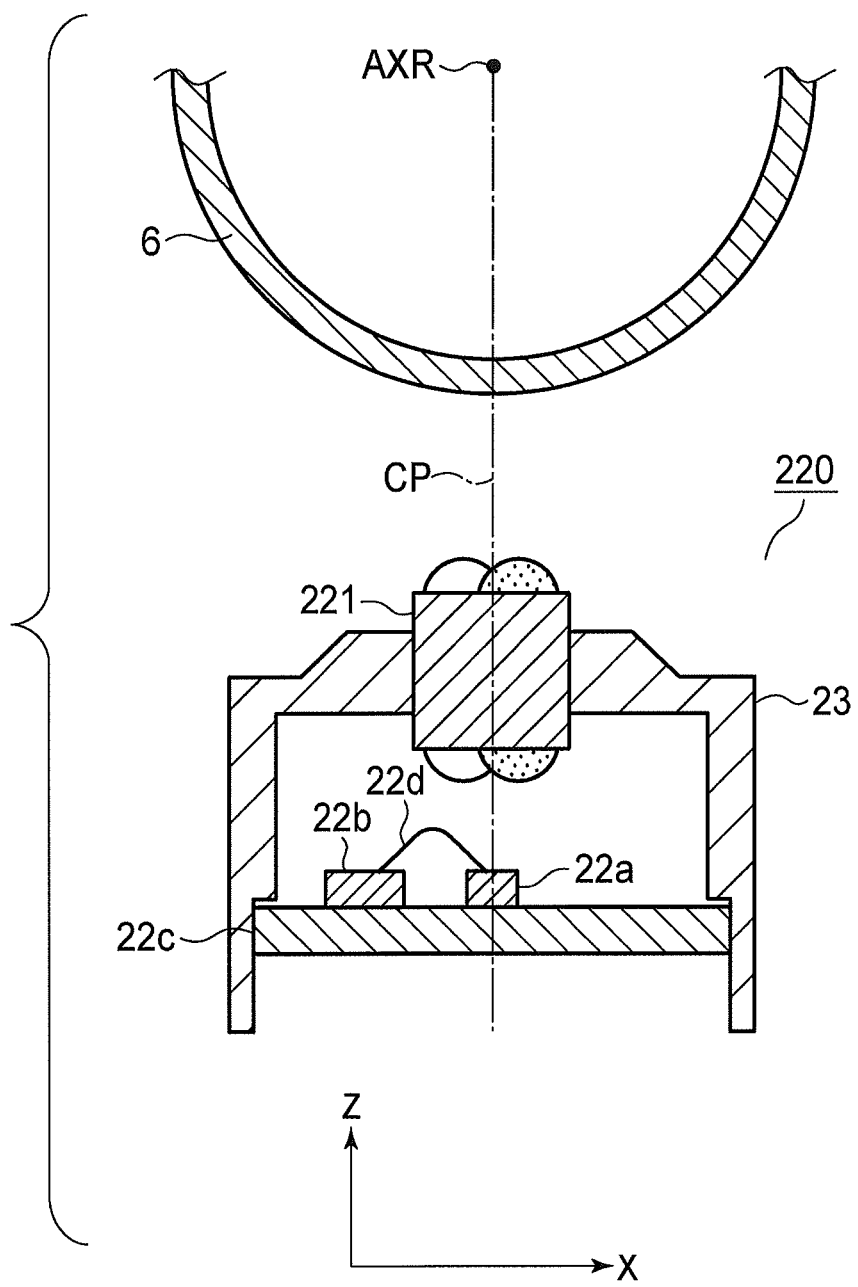
FIG. 12 is a cross-sectional view taken along a line XII-XII in FIG. 11.

FIG. 11 illustrates the outline of a photoconductive drum 6 and LED head 220. Elements similar to those of the first embodiment have been given the same reference characters. FIG. 12 is a cross-sectional view taken along a line XII-XII in FIG. 11.

The photoconductive drum 6 according to the second embodiment has substantially the same configuration as the photoconductive drum 6 according to the first embodiment. The LED head 220 differs from the LED head 120 in that the lens unit 221 is used. The other portions of the configuration of the LED head 220 are substantially the same as those of the LED head 120.

Figure 13:
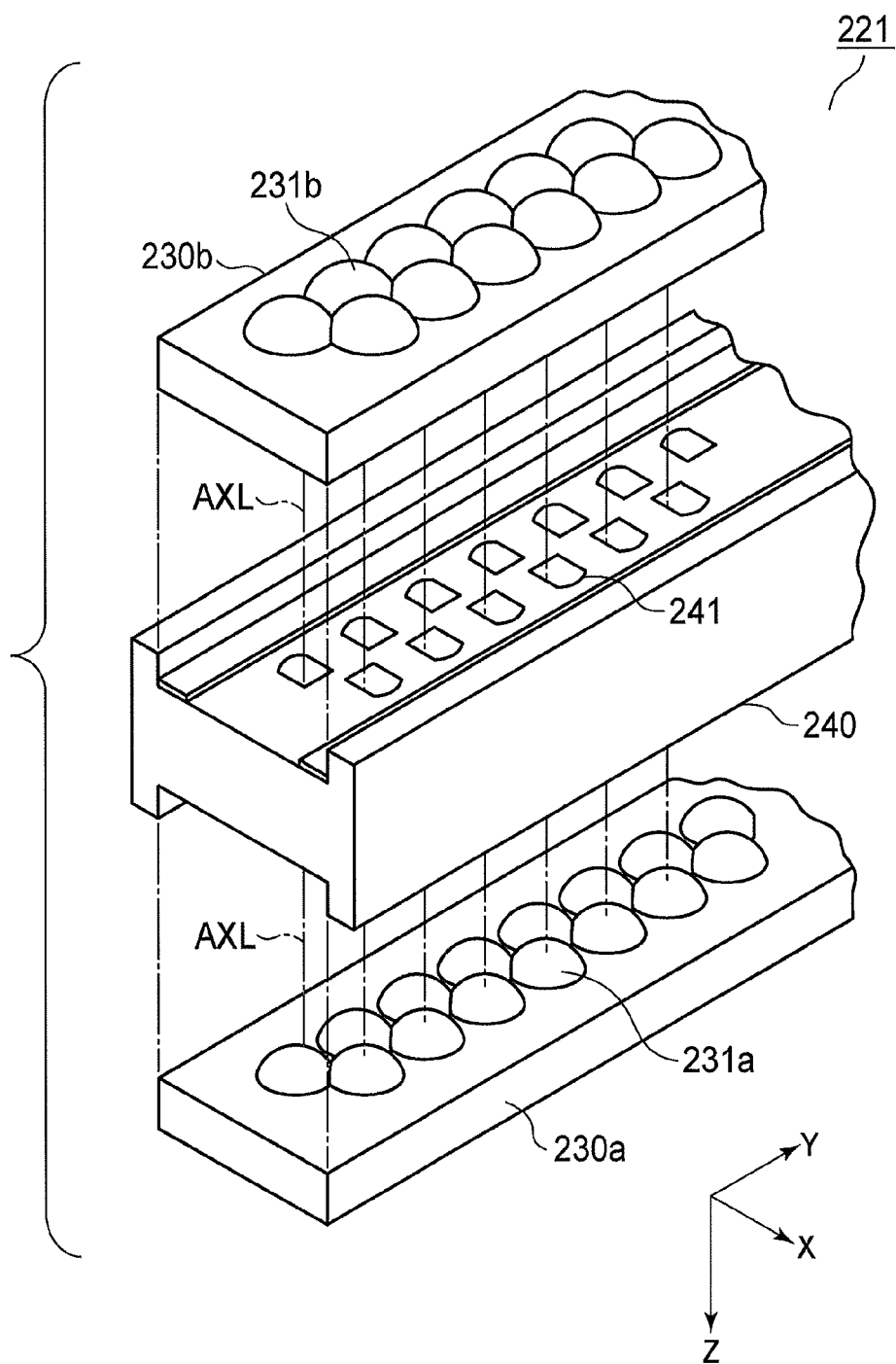
FIG. 13 is an exploded perspective view of the lens unit 221 shown in FIG. 11.

FIG. 13 is an exploded perspective view of the lens unit 221 shown in FIG. 11. Elements similar to those shown in FIG. 4 have been given the common reference characters.

Just as in the lens unit 121, the lens unit 221 includes a lens plate 230a, a lens plate 230b, and a light blocking member 240, which extend in their longitudinal directions with the light blocking member 240 held between the lens plate 230a and lens plate 230b in a sandwiched relation. The lens plate 230a directly faces an object plane OP and the lens plate 230b directly faces an image plane IP.

The lens plates 230a and 230b extend in their longitudinal directions. Each lens plate includes two parallel rows of micro lenses 231a and micro lenses 231b, respectively, that extend in directions in which the lens plate extends. The lens plates 230a and 230b are positioned such that the optical axis of each micro lens 231a is in line with that of a corresponding micro lens 231b.

The light blocking member 240 includes openings 241 that function as an aperture.

Figure 14:
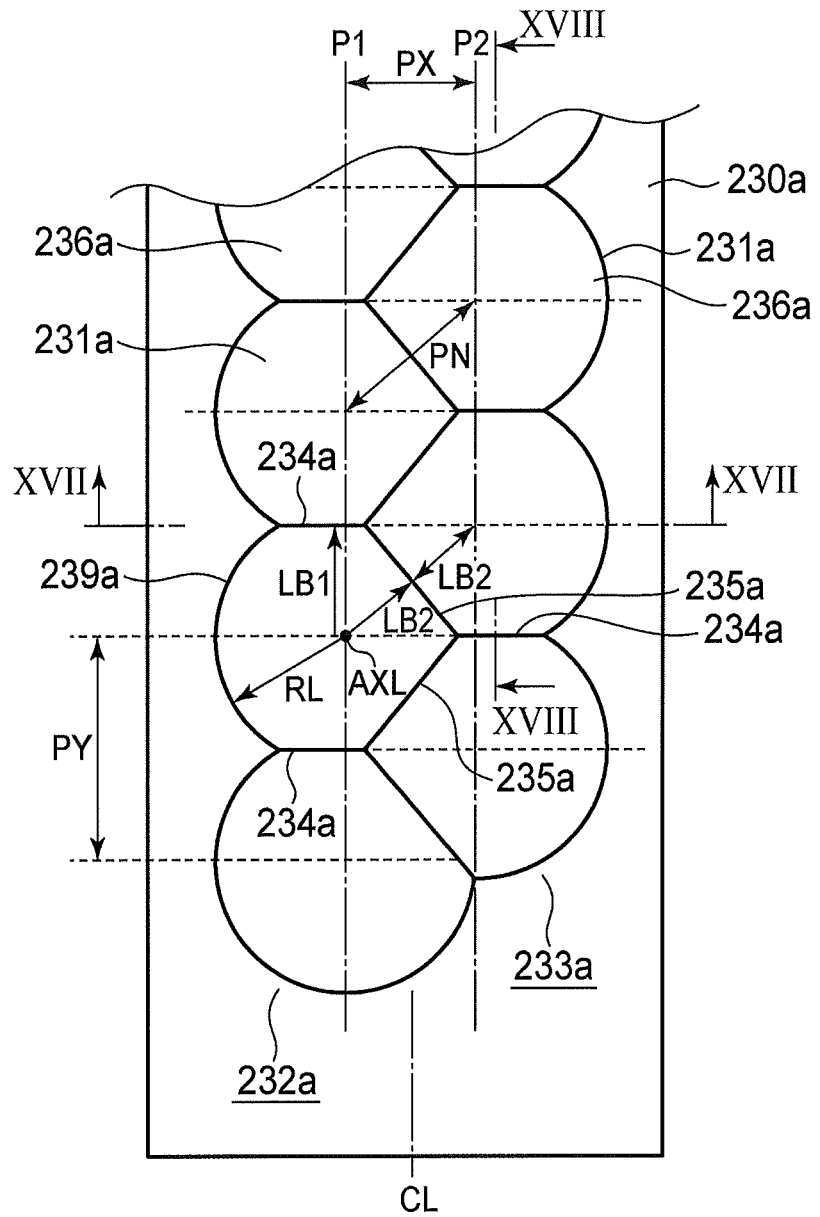
FIG. 14 is a top view of a lens plate of a second embodiment shown in FIG. 13, illustrating a lens surface.

FIG. 14 is a top view of the lens plate 230a shown in FIG. 13, illustrating a lens surface 236a. Elements similar to those of the first embodiment (FIG. 5) have been given the same reference characters. The lens surface 236a of the micro lenses 231a faces the object 51 and a lens surface 237a (FIG. 15) of the micro lenses 231a faces the light blocking member 240.

A plane P1 in which the optical axes of the micro lenses in the lens row 232a lie is spaced apart a distance PX from a plane P2 in which the optical axes of the micro lenses in the lens row 233a lie. The micro lenses 231a are aligned in the longitudinal direction so that the center-to-center distance between adjacent two micro lenses 231a is PY. The lens surface 236a of a micro lens 231a in one of the two lens rows 232a and 232b is contiguous with the lens surface 236a of a micro lens 231a in the other of the two lens rows 232a and 232b such that the optical axes of these two micro lenses 231a are spaced apart by a distance PN. A distance LB2 is a half of the distance PN. The radius RL of the lens surface 236a is larger than either the distance LB1 or the distance LB2.

Each micro lens 231a has two straight perimeter portions 234a extending in parallel directions substantially normal to the plane in which the optical axes of the micro lenses 231a lie, so that the lens surface 236a of one of adjacent micro lenses 231a in the lens row is contiguous with that of the other of the adjacent micro lenses 231a at the straight perimeter portions 234a.

Each micro lens 231a also has two straight perimeter portions 235a that meet at their ends and forms an angle. Each of the two straight perimeter portions 235a pass through the distance PN, dividing the distance PN in half, i.e., LB2 and LB2, such that RL>LB2 where LB2 is the distance between the optical axis AXL of a micro lens 231a and one of the two straight perimeter portion 235a. It can also be said that LB2 is substantially a half of the distance between the optical axis of the first lens in one of the two adjacent lens rows and the optical axis of the second lens in the other of the two adjacent lens rows. Although the distance LB2 is selected to be substantially the half of the distance, i.e., PN/2, between the optical axes, the distance LB2 may be in a range of PN/2±5%.

The radius of the second lens surface 237a of the micro lens 231a, RL, is larger than either the distance LB2 or the distance LB1. The micro lenses 231a in the lens rows 232a and 232b are staggered by half the center-to-center distance PY between adjacent micro lenses 231a such that a micro lens 231a in one of the lens row 232a and the lens row 232b is between two adjacent micro lenses 231a in the other, and is contiguous with the two adjacent micro lenses 231a at the two straight perimeter portions 235a.

Each of the lens plate 230a includes two rows of lens surfaces 236a arranged into an overlapping nested configuration in which each lens surface in one of the two rows extends into adjacent two micro lenses 231a in the other of the two rows with their surfaces in intimate contact with each other.

Each of the lens plate 230a includes two rows of lens surfaces 237a arranged into an overlapping nested configuration in which each lens surface 237a in one of the two rows extends into adjacent two lens surfaces 237a in the other of the two rows with their perimeter portions of lens surface being contiguous with each other. It is to be noted that the lens surfaces 237a in each of the two rows are not contiguous.

The lens plate 230b includes two rows of micro lenses 231a arranged into an overlapping nested configuration in which each micro lens in one of the two rows extends into adjacent two micro lenses 231a in the other of the two rows with their perimeter portions of lens surface being contiguous with each other. It is to be noted that the lens surfaces 237a in each of the two rows are not contiguous.

Figure 15:
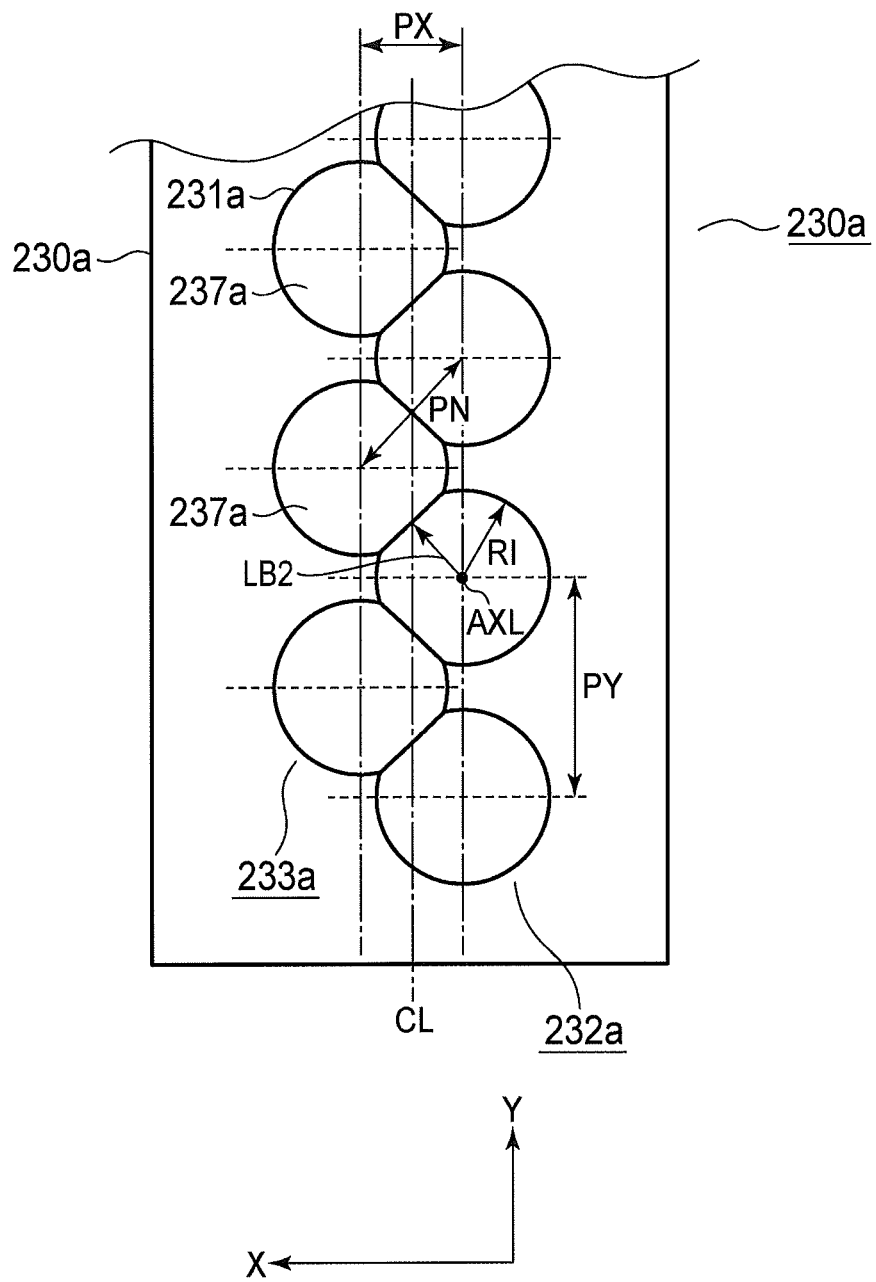
FIG. 15 is a top view of the lens plate shown in FIG. 13 illustrating another lens surface.

FIG. 15 is a bottom view of the lens plate 230a shown in FIG. 13 illustrating the lens surface 237a. Since the lens plate 230a has substantially the same configuration as the lens plate 230b, FIG. 15 may be understood as being a bottom view of the lens plate 230b.

The micro lenses 231a are aligned in the longitudinal direction of the lens plate 230a and are assembled to the lens unit 221 with the lens surface 237a facing the light blocking member 240.

The radius RI of the lens surface 237a is smaller than the radius RL of the lens surface 236a, and is larger than LB2.

The lens plate 230b has the same configuration as the lens plate 230a. That is, the micro lenses 231a corresponds to the micro lenses 231b, the lens surface 236a of the micro lenses 231a corresponds to the lens surface 236b of the micro lenses 231b, and the lens surface 237a of the micro lenses 231a corresponds to the lens surface 237b of the micro lenses 231b.

The lens plate 230a includes two rows of micro lenses 231a arranged into an overlapping nested configuration in which each micro lens 231a in one of the two rows extends into adjacent two micro lenses 231a in the other of the two rows with their straight perimeters in intimate contact with each other. The lenses 231b of the lens plate 230b are also arranged in the same manner as the lenses 231a of the lens plate 230a.

The lens plates 230a and 230b are formed of the same material as the lens plates 130a and 130b of the first embodiment. The micro lenses 231a and 231b have aspheric surfaces 236a, 237a, 236b, and 237b given by Equation (1) just as in the first embodiment.

Figure 16:
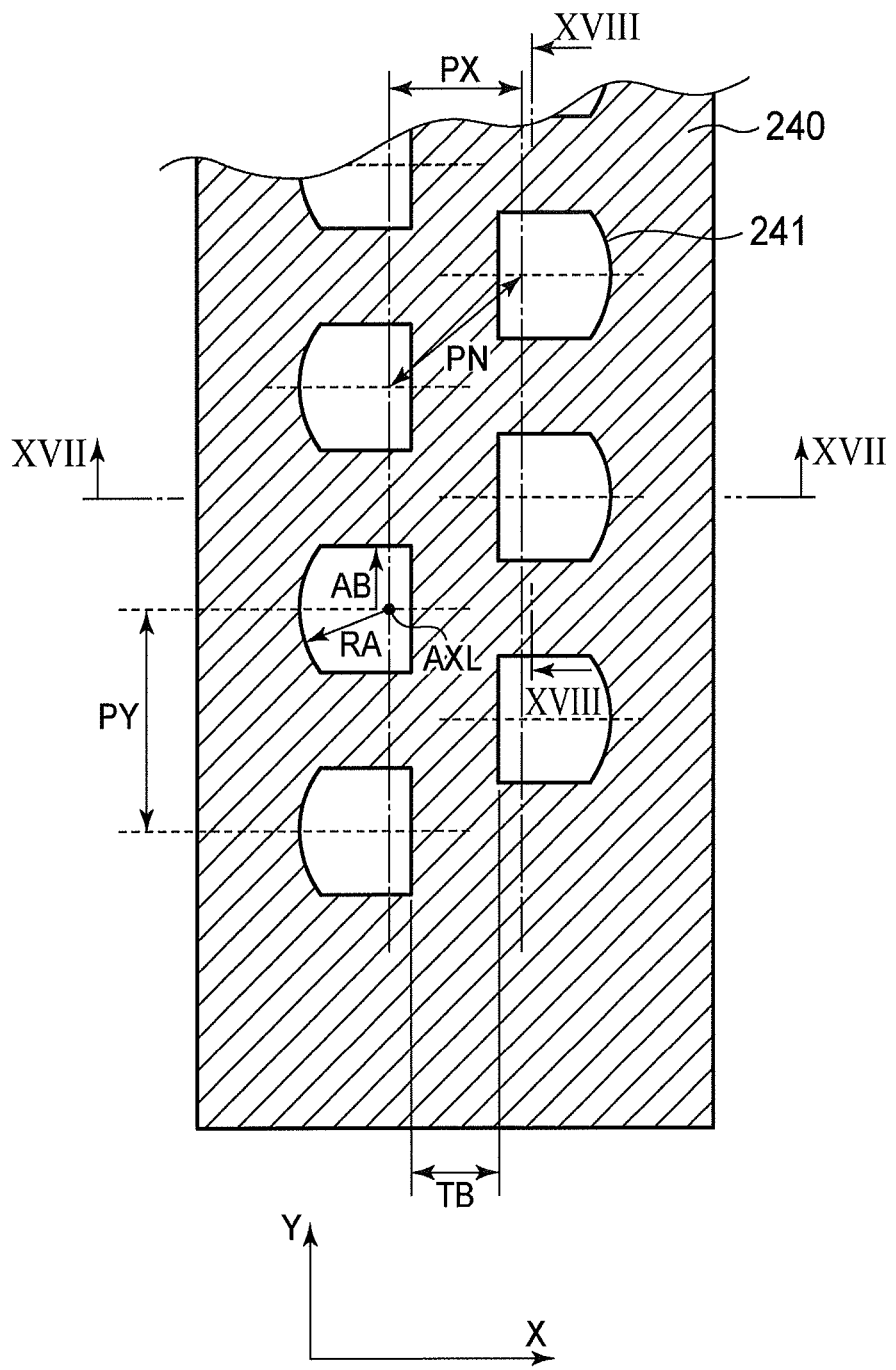
FIG. 16 is a top view of a light blocking member shown in FIG. 13.

FIG. 16 is a top view of the light blocking member 240 shown in FIG. 13. Elements similar to those shown in FIG. 6 have been given the common reference characters.

The light blocking member 240 according to the second embodiment has substantially the same configuration as that of the light blocking member 140 according to the first embodiment.

Figure 17:
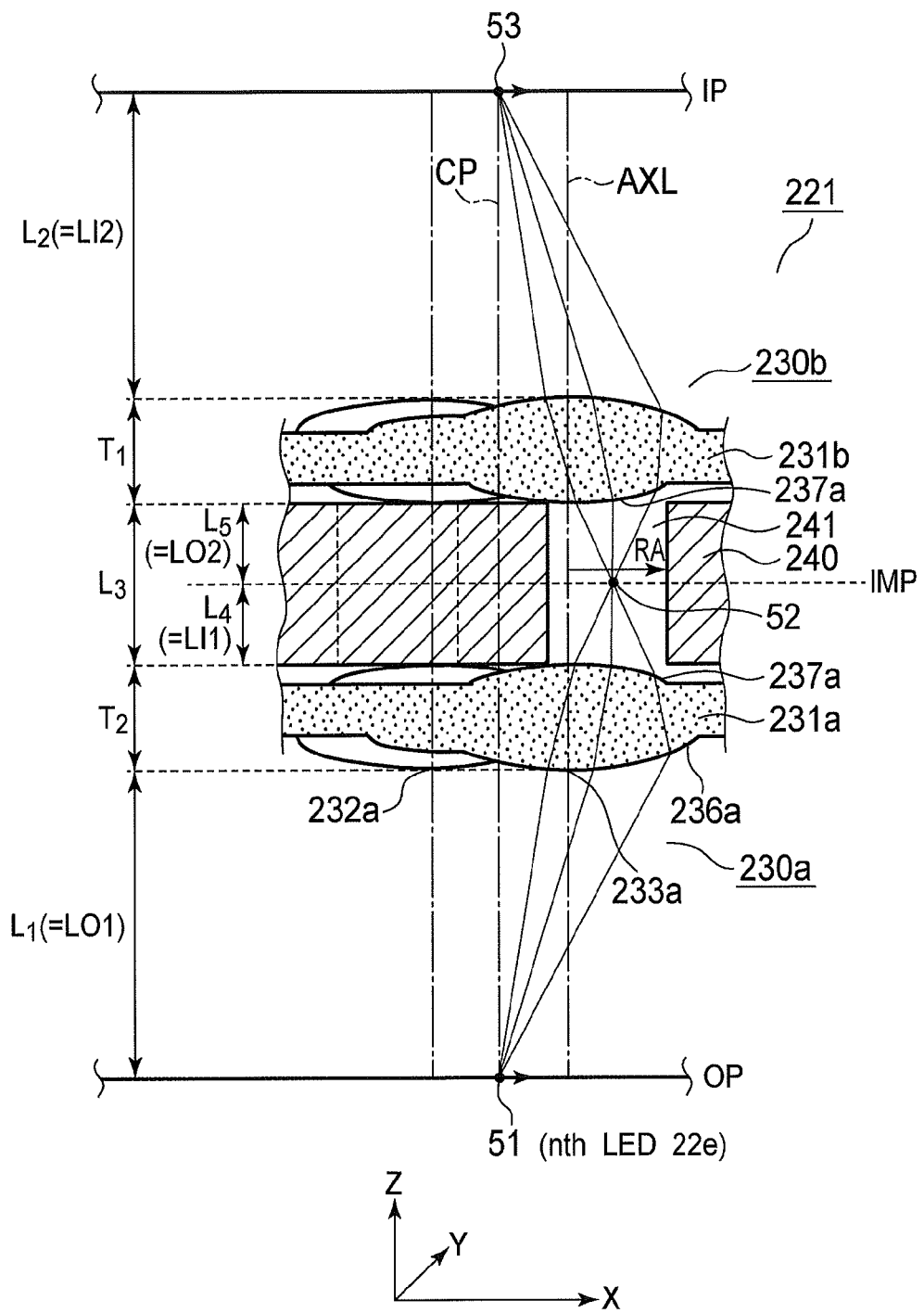
FIG. 17 is a partial cross-sectional view of the lens unit taken along a line XVII-XVII in FIG. 16 or a line XVII-XVII in FIG. 14.

FIG. 17 is a partial cross-sectional view of the lens unit 221 taken along a line XVII-XVII in FIG. 16 or a line XVII-XVII in FIG. 14, the lines XVII-XVII lying in a plane in which the optical axes of the micro lenses lie. FIG. 17 illustrates the lens unit 221, the object plane OP, and the image plane IP. Elements common to those shown in FIG. 8 have been given the same reference characters.

The lens unit 221 will be described in detail with reference to FIG. 17.

The nth LED 22e or the object 51 is located substantially in a plane CP that divides the width of the lens unit 221 in half and in which a longitudinal center line CL of the lens unit 221 lies. The object plane OP is a distance L1 away from the micro lens 231a. The micro lenses 231b and 231a are spaced apart by a distance L3 and the optical axes AXL of the micro lenses 231b are in line with those of corresponding micro lenses 231a. The image plane IP of the lens unit 221 is a distance L2 away from the micro lenses 231b. The micro lens 231a has a thickness T2 and the micro lens 231b has a thickness T1.

The micro lens 231a forms the image 52 of the object 51 in an intermediate image plane IMP at a distance L4 from the micro lens 231a or a distance L5 from the micro lens 231b, the distance L4 being equal to the distance L5. The micro lens 231b forms an erect image 53 of the intermediate image 52, the erect image 53 having unity magnification and being located in the image plane IP at the distance L2 from the micro lens 231b.

Suppose that an object is placed in front of the lens surface 236a of a single micro lens 231a. The distance L01 and LI1 are related such that when an object is placed in an object plane spaced a distance L01 from a first lens surface 236a of the micro lens 231a, the micro lens 231a forms an image in an image plane spaced a distance LI1 from the second lens surface 237a of the micro lens 231a. In FIG. 17, L1, L4, L01, and LI1 are related such that L1=L01 and L4=LI1. Likewise, suppose that an object is placed in front of the lens surface 237a of the single lens micro lens 231b. The distance LI2 and L02 are related such that when an object is placed in an object plane spaced a distance L02 from the single micro lens 231b, the micro lens 231b forms an image in an image plane spaced a distance LI2 from the micro lens 231b. In FIG. 17, L2, L5, LI2, and L02 are related such that L2=LI2 and L5=L02.

The distance L1 between the object plane OP and the micro lens 231a is equal to the distance L2. The micro lens 231a and micro lens 231b are spaced apart by a distance L3=L4+L5.

Figure 18:
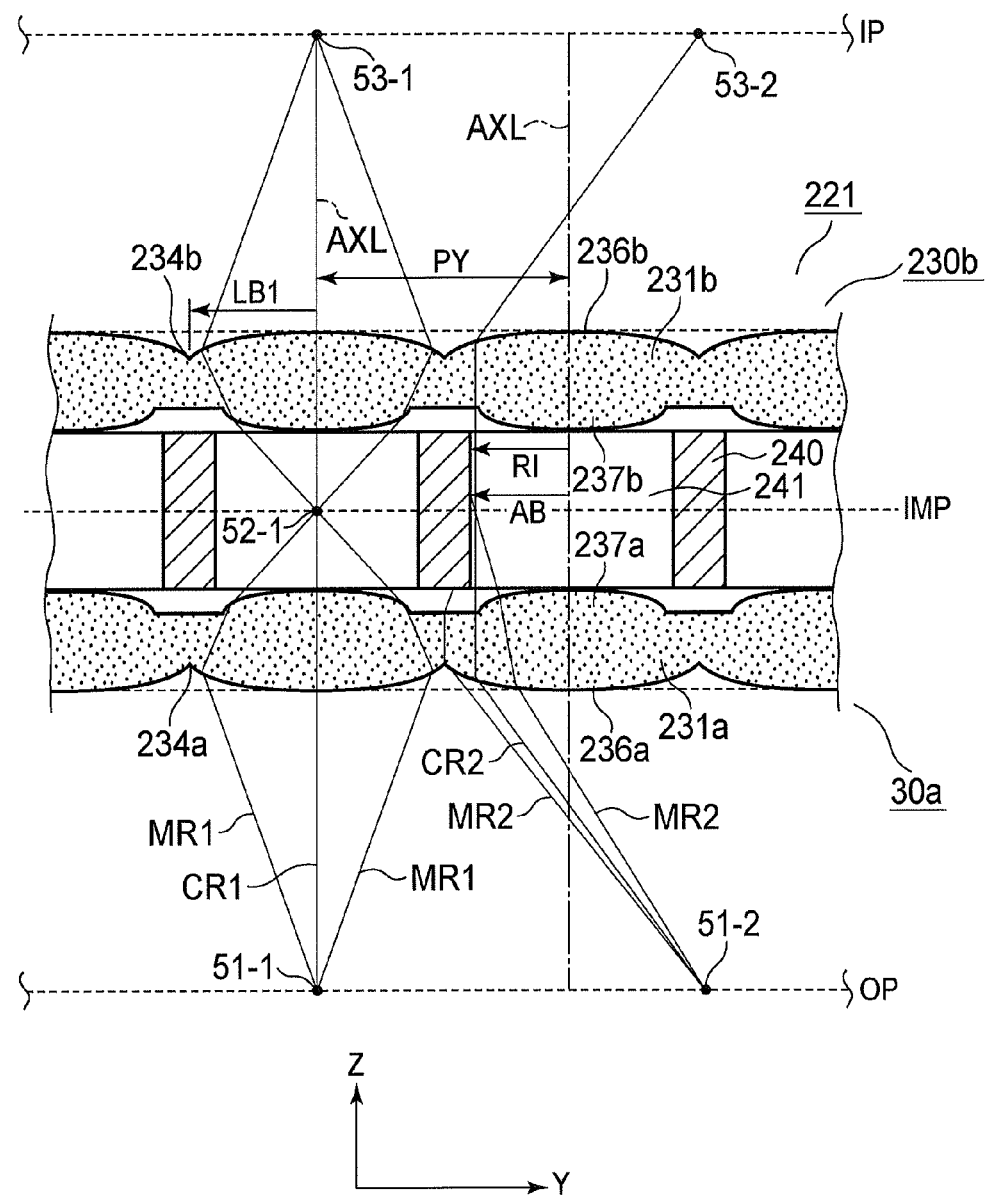
FIG. 18 is a partial cross-sectional view taken along a line XVIII-XVIII in FIG. 14 or a line XVIII-XVIII in FIG. 16.

FIG. 18 is a partial cross-sectional view taken along a line XVIII-XVIII in FIG. 14 or a line XVIII-XVIII in FIG. 16, the lines XVII-XVII lying in a plane P2 in which the optical axes of the micro lenses lie. FIG. 18 illustrates the lens unit 221, the object plane OP, and the image plane IP, and is a cross-sectional view of the lens unit 221 cut in the plane P2. The micro lenses 231a and 231b are aligned in the Y direction and the optical axes AXL extend in the Z direction. Elements common to those of the first embodiment have been given the common reference characters.

Operation of Second Embodiment

The image forming apparatus according to the second embodiment operates in much the same way as that according to the first embodiment.

The operation of the lens unit 221 will be described with reference to FIG. 17. The micro lens 231a forms an inverted, de-magnified intermediate image 52 of the object 51 in the intermediate image plane IMP. The inverted, de-magnified image enters the micro lens 231b, which in turn forms a further inverted image or an erect image of unity magnification in the image plane IP.

The light blocking member 240 blocks the light component that does not contribute to the formation of an image in the image plane IP. The principal rays of the light emitted from all points in the object plane OP are parallel in the area between the micro lenses 231a and the micro lenses 231b, i.e., a so-called telecentric system.

Likewise, if the micro lenses 231a and 231b have the same configuration, images are formed as follows: The micro lens 231a forms an inverted, de-magnified intermediate image 52 of the object 51 in the intermediate image plane IMP. The inverted, de-magnified image enters the micro lens 231b, which in turn forms a further inverted image or an erect image of unity magnification in the image plane IP. The principal rays of the light emitted from all points in the object plane OP are parallel to the optical axis AXL in the area between the micro lenses 231a and the micro lenses 231b, i.e., so-called telecentric system.

The operation of the lens unit 221 will be described with reference to FIG. 18. The light emitted from an object 51-1 enters the lens surface 236a. The principal rays CR1 passes along or substantially in the optical axis AXL while light components MR1 in the vicinity of the principal rays enter an area of the lens surface 236a closer to the boundary 234a between the contiguous surfaces 236a.

Since the distance LB1 of the micro lens 231a (FIG. 14) is PY/2, a large amount of light can pass through the micro lens 231a and hence a bright image 53-1.

The inverted, the de-magnified image 52-1 of the object 51-1 is formed in the intermediate image plane IMP. The light from the intermediate image passes through the lens surface 237b, so that the erect image 53-1 is formed in the image plane IP. The principal rays CR1 passes through the lens surface 236b substantially along the optical axis AXL while the light components MR1 except for the principal rays CR1 pass through an area of the lens surface 236b closer to the boundary 234b between contiguous surfaces 236b. Both the principal rays CR1 and light components MR1 form an image on the image plane IP.

Since the distance LB1 of the micro lens 231b is PY/2, a large amount of light can pass through the micro lens 231b—hence the bright image 53-1.

Principal rays CR2 are parallel to the optical axis AXL in the area between the lens surfaces 237a and 237b, i.e., a telecentric optical system, and passes near the inner wall of the openings 241. The light components MR2 away from the principal rays emitted from the object 51-2 are blocked by the light blocking member 240. Thus, the light blocking member 240 blocks the light components MR2, emitted from the object 51-2, so that light components MR2 are prevented from traveling in a direction toward an area outer than the distance AB of the lens surfaces 237a and 237b. As a result, the radius RI of the lens surfaces 237a and 237b may be substantially equal to the distance AB of the openings 241, and may be smaller than the radius RL of the lens surfaces 236a and 236b. Also, the distance LB2 between the optical AXL and the straight perimeter portion 235a of lens surface 237a and 237b (FIG. 14) may be smaller than the distance LB1 of the surface 237a and 237b. It is to be noted that the above-described dimensional relations among RI, AB, LB1 and LB2 still provides sufficient light for forming the image 53-1 just as in the first embodiment.

The lens unit 221 according to the second embodiment has lens surfaces 236a and 236b (FIG. 14 shows only lens surface 236a) contiguous at the straight perimeter portion 234a and the lens surfaces 236b contiguous at straight perimeter portion 234a. The lens radius RI of the lens surface 237a (FIG. 15) is smaller than either the lens radius RL of the lens surface 236a, or the distance LB1 (FIG. 14) of the lens surface 236b is smaller than the distance LB1 of the lens surface 236b. The distance LB2 of the lens surface 237a (FIG. 15) or 237b is smaller than either the lens radius RL of the lens surface 236a, or the distance LB1 (FIG. 14) of the lens surface 236b. Therefore, the lens surfaces 237a and 237b can be formed without difficulty.

Advantages of Second Embodiment

The radius RI of the lens surfaces 237a and 237b is smaller than the radius RL of lens surfaces 236a and 236b, and the distance LB2 of the lens surfaces 237a and 237b is shorter than the distance LB1 of lens surfaces 236a and 236b. The lens plates 230a and 230b and lens unit 221 provide substantially the same advantages as the first embodiment. The lens plates 230a and 230b improve manufacturing efficiency, and are more suitable for mass production as compared to the conventional optical system.

The image forming apparatus incorporates the LED head 220, which in turn incorporates the lens unit 221. The image forming apparatus not only provides substantially the same advantages as the first embodiment but also reduces manufacturing cost.

Third Embodiment

Configuration

The image forming apparatus and LED head 320 according to a third embodiment have substantially the same configuration as that of the first embodiment. The configuration of a lens unit 321 according to the third embodiment will be described below.

Figure 19:
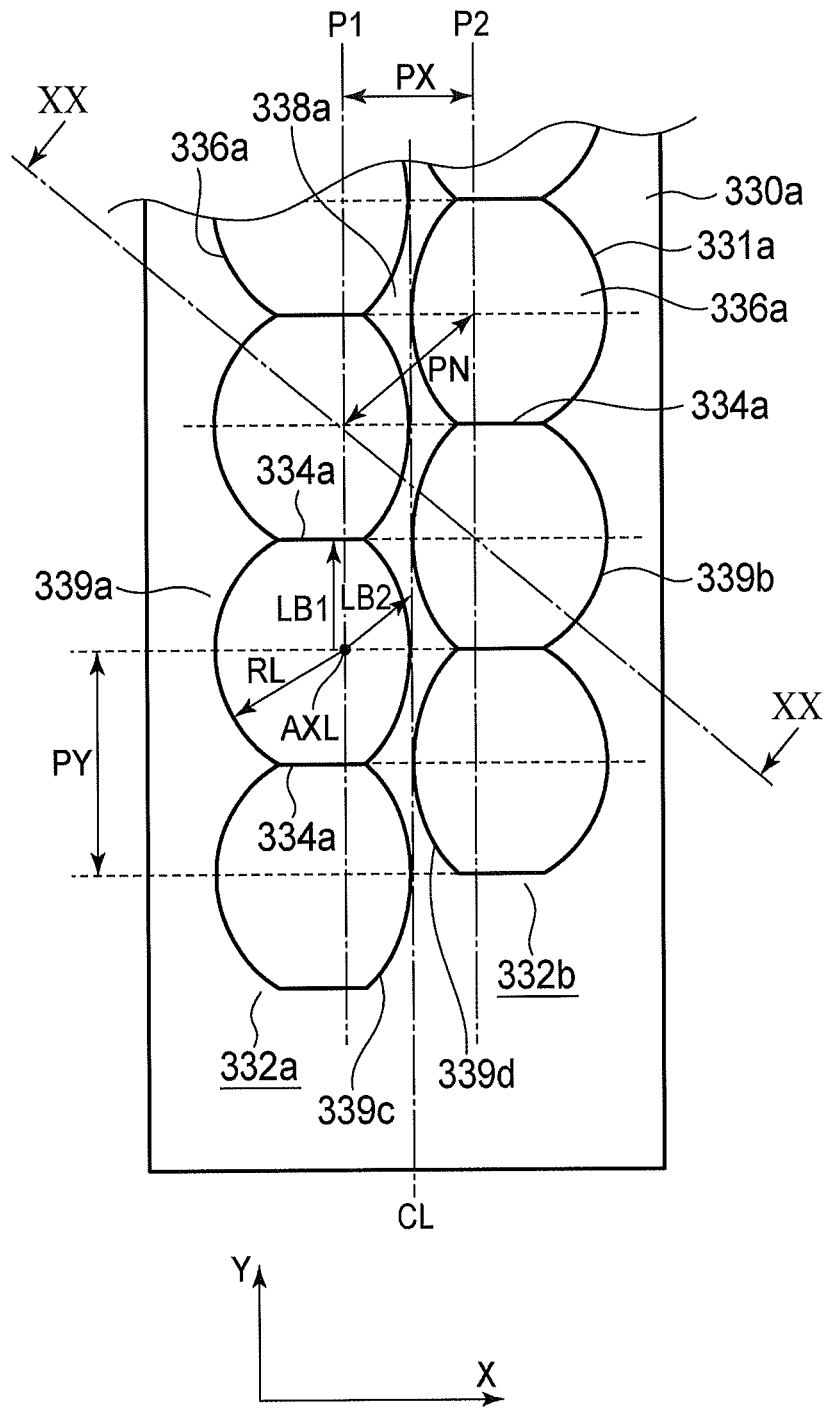
FIG. 19 is a top view of a lens plate of a third embodiment.

FIG. 19 is a top view of a lens plate 330a, illustrating lens surfaces 336a. Elements similar to those of the first embodiment (FIG. 5) have been given the common reference characters. The lens plate 330a has substantially the same configuration as the lens plate 330b and therefore the lens plate 330a will be described mainly for simplicity.

The lens plate 330a extends in a longitudinal direction thereof, and includes a lens row 332a and a lens row 332b. The lens plate 331a and lens rows 332a and 332b are formed in a single piece construction, and extend in straight parallel directions. Each lens row has micro lenses 331a aligned contiguously with a center-to-center distance PY such that the optical axes AXL of the micro lenses 331a lie in one of two parallel planes P1 and P2 and the optical axes of the micro lenses 331b lie in the other. The two parallel planes P1 and P2 are spaced apart by a distance X.

Each micro lens 331a has two straight perimeter portions 334a extending in parallel directions substantially normal to the plane in which the optical axes AXL of the micro lenses 331a lie, so that the lens surface 336a of one of adjacent micro lenses 331a in the lens row is contiguous with that of the other of the adjacent micro lenses 331a at the straight perimeter portions 334a. The distance between the optical axis AXL or vertex of the micro lens 331a and one of the parallel straight perimeter portions 334a is LB1 which is PY/2. It can also be said that LB1 is a half the distance PY between the optical axes of two contiguous lenses 331a in one of the two adjacent lens rows.

The distance between the optical axis AXL or vertex and the curved perimeter portion 339c and 339d that directly faces an adjacent lens row is LB2 such that LB2<PN/2. Also, the lens radius RL of the micro lens 331a is larger than either the distances LB1 or the distance LB2.

A flat area 338a is formed between the lens row 332a and 333a, and extends along the longitudinal center line CL, or substantially in the longitudinal direction of the lens plate 330a. The flat area 338a is contiguous with the micro lenses 331a and 331b. A flat area 338b (FIG. 20) is also formed on the lens plate 330b.

Figure 20:
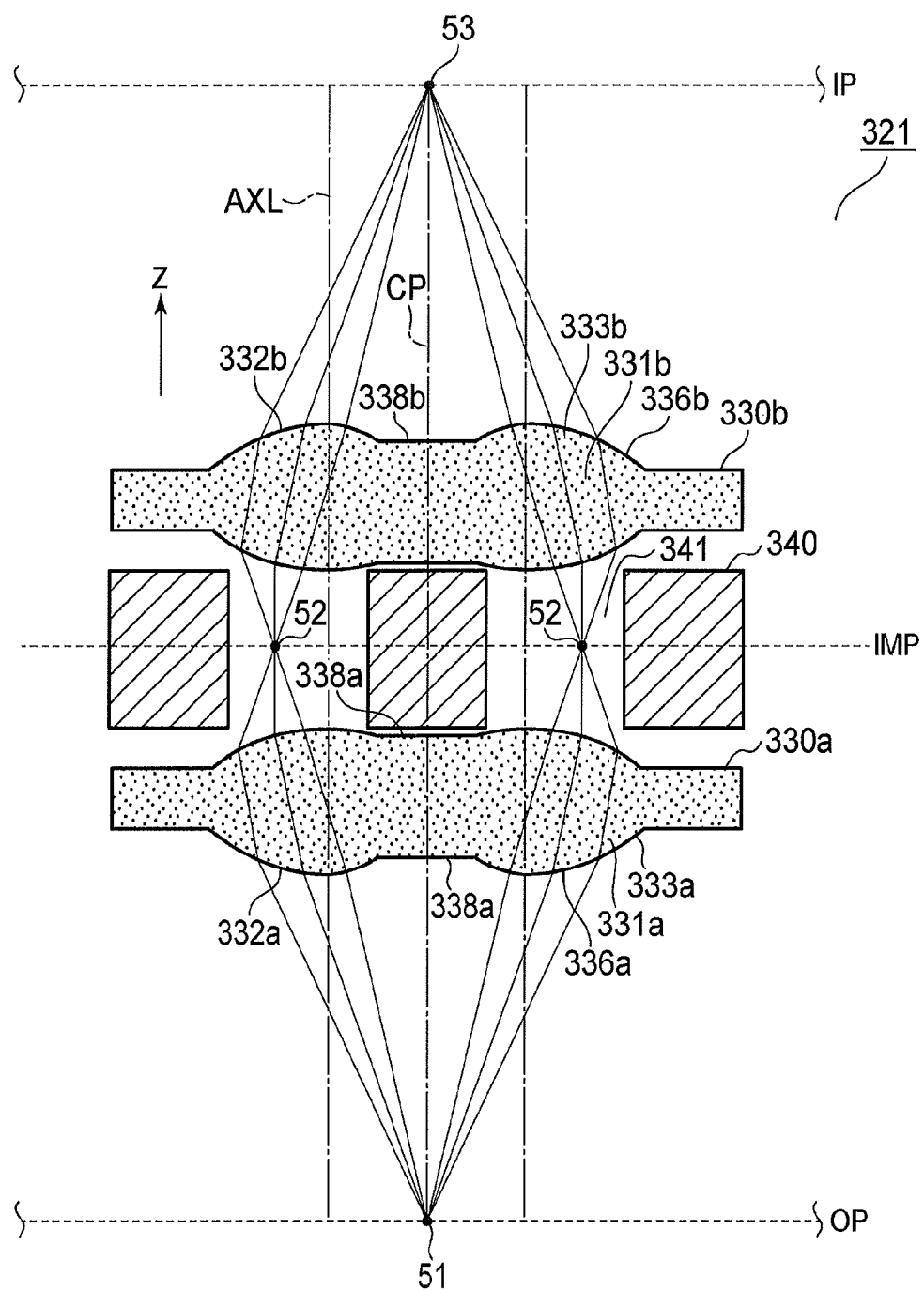
FIG. 20 is a partial cross-sectional view of the lens unit 321 taken along a line XX-XX in FIG. 19.

FIG. 20 is a partial cross-sectional view of the lens unit 321 taken along a line XX-XX in FIG. 19.

Operation of Third Embodiment

The image forming apparatus according to the third embodiment operates in much the same manner as that of the first embodiment. The LED head 320 operates substantially in the same manner as the LED head 120 according to the first embodiment.

The lens unit 321 will be described in detail with reference to FIG. 20. The light emitted from an object 51 enters the micro lens 331a, which in turn forms an intermediate image 52 in the intermediate image plane IMP. This intermediate image 52 is an inverted, de-magnified image. The light passes a space between the micro lens 331a and the micro lens 331b closer to the outer widthwise edge or end of the lens unit 321 than the optical axis AXL. Thus, no light passes through the flat area 338a which is not part of the micro lens. Therefore, the flat area 338a is not detrimental to the formation of a bright image.

The micro lens 331b forms an inverted image of the intermediate image 52, i.e., an erect image of unity magnification in the image plane IP, the light exiting the micro lens 331b passes a space substantially between the micro lens 331a and the micro lens 331b closer to the outer widthwise end of the lens unit 321 than the optical axis AXL. Thus, no light passes through the flat area 338b which is not part of the micro lens. Therefore, the flat area 338b is not detrimental to the formation of a bright image.

Referring to FIG. 19, forming the flat area 338a reduces the lens surface 336a, permitting easy manufacture of the lens unit 321.

Advantages of Third Embodiment

The lens surfaces 336a and 336b have a smaller surface area than either the lens surfaces 236a or the lens surface 236b according to the second embodiment and the lens surfaces 131a and 131b of the first embodiment. Thus, the lens unit 321 provides substantially the same advantage as the first embodiment. The lens unit 321 provides improved manufacturing efficiency, and is more suitable for mass production.

The image forming apparatus incorporates the LED head 320, which in turn incorporates the lens unit 321. The image forming apparatus not only provides substantially the same advantages as the first embodiment but also reduces manufacturing cost.

Fourth Embodiment

Configuration

Figure 21:
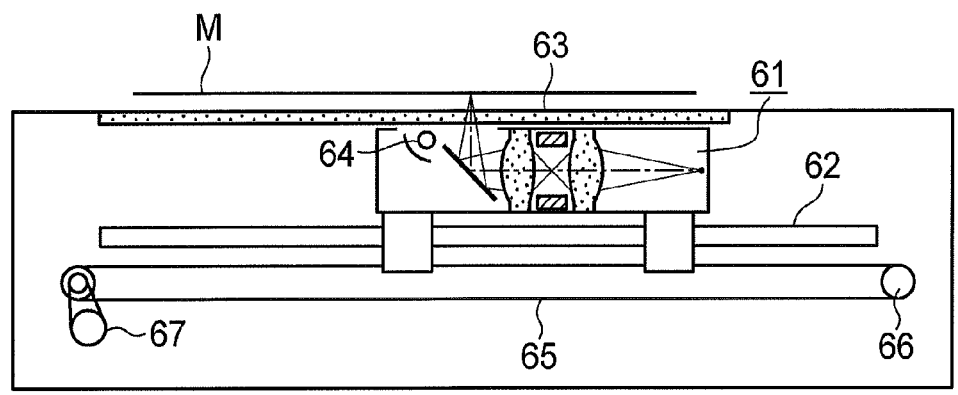
FIG. 21 illustrates the outline of a pertinent portion of the reading apparatus according to a fourth embodiment.

FIG. 21 illustrates the outline of a pertinent portion of the reading apparatus according to a fourth embodiment.

The reading apparatus takes the form of, for example, a scanner. The reading apparatus includes a reading head 61, a rail 62, a flat bed 63, a lamp 64, a drive belt 65, a plurality of pulleys 66, and a motor 67.

The reading head 61 receives the light reflected back from the surface of the original document M, and converts the received light into electronic data. The reading head 61 is movable back and forth on the rail 62. The original document M is placed on the flat bed 63 formed of a material transparent to light. A lens unit 424, the flat bed 63, and the lamp 64 are disposed in the reading head 61 such that the light reflected back from the original document M enters the lens unit 424. The drive belt 65 is disposed about a plurality of pulleys 66. A part of the drive belt 65 is secured to the reading head 61. The motor 67 drives the drive belt 65 to move the reading head 61 to move back and forth.

Figure 22:
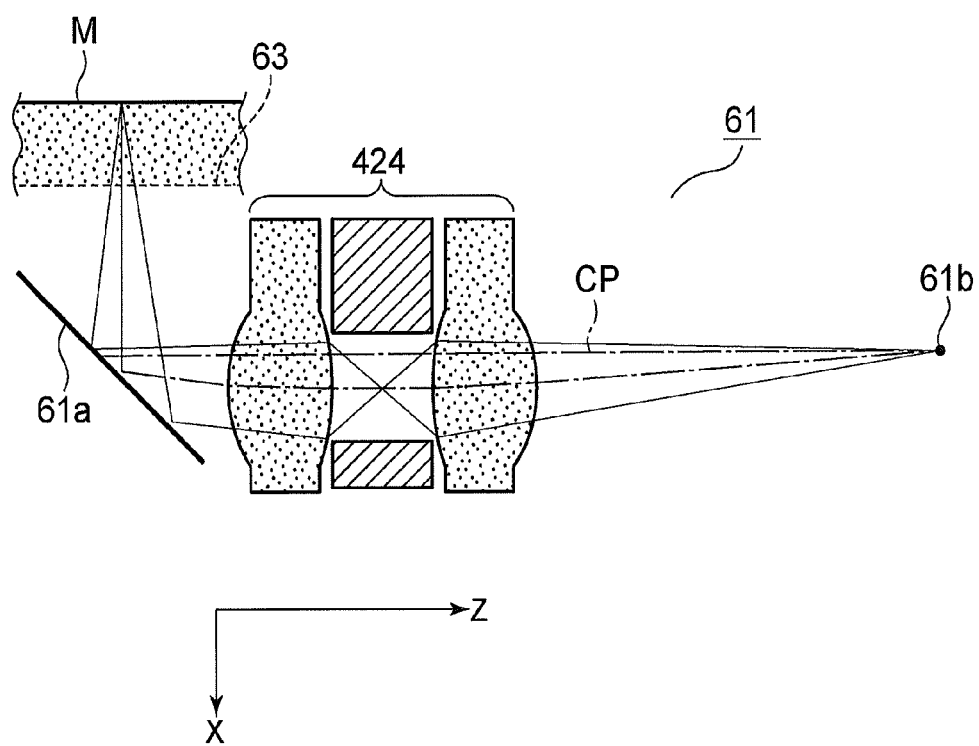
FIG. 22 illustrates the outline the lens unit which is one of lens units of the first to third embodiments.

FIG. 22 illustrates the outline the lens unit 424 which is one of lens units 121, 221, and 321 of the first to third embodiments. A mirror 61a bends the light path of the light reflected back from the original document M, guiding the light to enter the lens unit 424. The lens unit 424 forms an image on an imaging section (e.g., line sensor) 61b. The line sensor 61b includes a plurality of light receiving elements aligned in a straight line and converts the light reflected from the original document M into an electrical signal.

Figure 23:
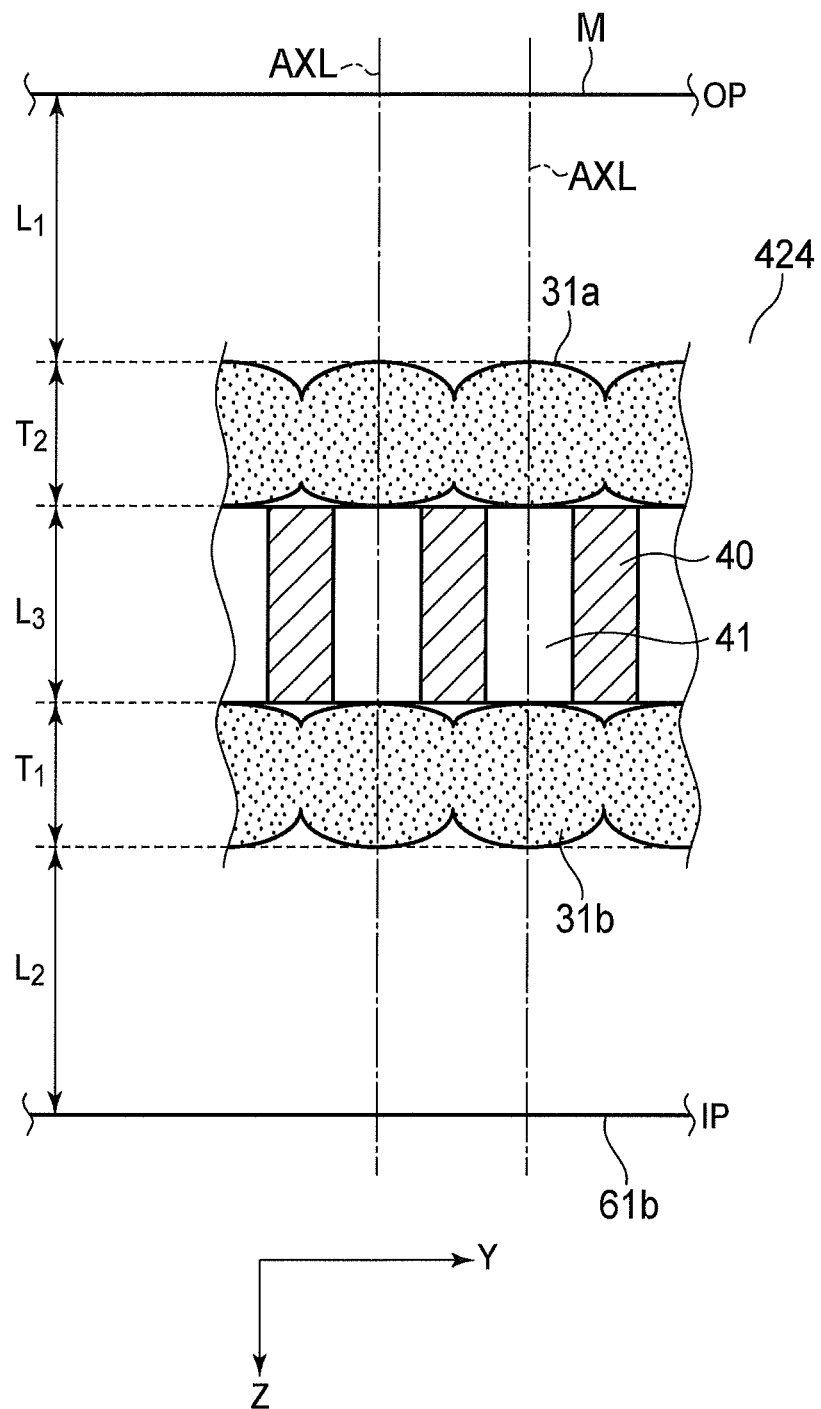
FIG. 23 is a cross-sectional view, illustrating the lens unit of the fourth embodiment shown in FIG. 22.

FIG. 23 is a cross-sectional view, illustrating the lens unit 424 shown in FIG. 22. The lens unit 424 has the configuration of one of the lens units 121, 221, or 321 of the first to third embodiments, and the detailed description thereof is omitted.

{Operation of Reading Apparatus}

The operation of the reading apparatus according to the fourth embodiment will be described with reference to FIG. 21.

The lamp 64 lights up, and the light emitted from the lamp is reflected by the surface of the original document M. The motor 67 drives the drive belt 65 to run, causing the reading head 61 to move across the surface of the original document M.

{Operation of Reading Head}

The operation of the reading head 61 according to the fourth embodiment will be described below with reference to FIG. 22.

The light reflected back by the original document M transmits through the flat bed 63, is bent by the mirror 61a, and enters the lens unit 424. The lens unit 424 forms the image of the original document M on the line sensor 61b, which in turn converts the image of the original document M into an electrical signal.

{Evaluation of Reading Unit}

Using the reading apparatus according to the fourth embodiment, an original document having the image shown in FIG. 10 was read, the obtained electronic data was substantially equal in quality to the original document M.

Advantages of Fourth Embodiment

The reading head 61 employs the lens unit constituted of one of the lens units 121, 221, or 321. Thus, if light emitted from the lamp 64 decreases somewhat in light power, the reading head 61 can still form an image of the original document M with a sufficient brightness. Thus, the reading head 61 provides power saving effects and prolongs its usable lifetime.

The present invention is not limited to the above-described embodiments, and a variety of modifications can be made. Such modifications include the following:

(a) Although the lens surface of the micro lenses 131a, 131b, 231a, 231b, 331a, and 331b has been described as having straight perimeter portions and a partially circumferential perimeter portion, the lens surface may have a variety of shapes including an ellipse and an arbitrary polygon.

(b) The micro lenses 131a, 231a, 331a, 131b, 231b, and 331b have an aspheric surface with a rotational symmetry given by Equation (1). The invention is not limited to this and may also have a spherical surface. The surface may also be of other types of curved surfaces including an anamorphic aspheric surface, an elliptical surface, a hyperboloid surface, and a conic surface;

(c) The lens plates 130a, 230a, 330a, 130b, 230b, and 330b have been described as being formed using a metal mold. Alternatively, the lens plates may be formed by machining or molding by the use of a mold made of a resin. Although the lens plates have been described as being formed of resin, the lens plates may also be formed of glass.

(d) The light blocking members have been described as being molded from polycarbonate. Alternatively, the light blocking members may be formed by machining or etching.

(e) The LED array 22a includes a plurality of LEDs 22e as light emitting elements. Organic EL elements or lasers may also be used in place of LEDs.

(f) The image reading apparatus has been described in terms of a scanner that converts the image of an original document M into electronic data. The fourth embodiment may be applied to apparatuses other than an image reading apparatus, for example, an authentication apparatus based on biometric information, a dimension measuring device, an input/output device, or a communication apparatus, which all employ switches and sensors that converts optical signals into electrical signals.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A lens plate, comprising:
at least one lens row including a plurality of lenses aligned in a first direction, each lens including a lens surface that includes perimeter portions extending in a second direction substantially perpendicular to the first direction such that two adjacent lenses are contiguous with each other at the perimeter portions;
wherein the perimeter portions are first perimeter portions, each of the first perimeter portions being located substantially midway between an optical axis of one of the two adjacent lenses and an optical axis of the other of the two adjacent lenses;
wherein the lens surface includes a second perimeter portion located a longer distance from the optical axis than a half of a distance between the optical axis of one of the two adjacent lenses and the optical axis of the other of the two adjacent lenses.

2. The lens plate according to claim 1, wherein the at least one lens row is a first lens row and a second lens row extending in parallel directions;
wherein each of the lenses in the first lens row and the second lens row includes a third perimeter portion, and the first lens row and the second lens row are disposed such that the lens in the first lens row are contiguous with the lens in the second lens row at the third perimeter portion.

3. The lens plate according to claim 2, wherein the third perimeter portion includes two straight portions;
wherein each of the straight portions is located substantially midway between an optical axis of one of the lenses in the first lens row and an optical axis of an adjacent lens in the second lens row.

4. The lens plate according to claim 3, wherein the first lens row and the second lens row are arranged such that a lens in the first lens row is between two adjacent lenses in the second lens row.

5. The lens plate according to claim 4, wherein the third perimeter portion includes two straight perimeter portions that meet at their ends to form an angle with each other.

6. A lens unit incorporating two lens plates each of which is defined in claim 1, wherein the lens unit includes a light blocking member including openings that extends therethrough;
wherein the two lens plates and the light blocking member are assembled together such that the optical axis of each lens passes through a corresponding one of the openings.

7. The lens unit according to claim 6, wherein each of the openings includes fourth perimeter portions extending in a direction substantially perpendicular to a direction in which the lens row extends, and a fifth perimeter portion having a radius;
wherein each of the fourth perimeter portions is spaced apart by a first distance from the optical axis, the fifth perimeter portion is a part of a circumference having a radius, the fifth perimeter portion being located a second distance from the optical axis, the second distance being longer than the first distance.

8. An image firming apparatus comprising:
an exposing apparatus incorporating a lens unit according to claim 6; and
an image forming section that forms an image by developing an electrostatic latent image formed by the exposing apparatus.

9. An image reading apparatus incorporating a lens unit according to claim 6;
a light source that emits light to an original document including an image thereon; and
an image reading section that receives light reflected back from the image on the original document and then outputs image data in the form of an electrical signal.

10. An exposing apparatus incorporating a lens unit according to claim 6, wherein the exposing apparatus comprises a light emitting section that emits light to the lens unit.

11. The exposing apparatus according to claim 10, wherein the light emitting section includes a plurality of light emitting diodes.

12. The lens plate according to claim 6, wherein each of the openings of the light blocking member has a circumferential perimeter portion, two parallel straight perimeter portions extending in directions substantially parallel to the second direction, and a single straight perimeter portion extending in a direction substantially parallel to the first direction.

13. The lens plate according to claim 12, wherein a radius of the lens is the same as a radius of the circumferential perimeter portion of each of the openings of the light blocking member.

14. The lens unit according to claim 6, wherein the lens surface is a first surface, the lens has a second surface opposing the first surface, the second surface directly facing the light blocking member;
wherein the first surface includes a circumferential portion having a first radius and the second surface includes a circumferential perimeter portion having a second radius, the second radius being smaller than the first radius.

15. The lens plate according to claim 14, wherein a radius of the second surface of the lens is different from a radius of the first surface of the lens.

16. The lens plate according to claim 14, wherein the first surface and the second surface have different shapes.

17. The lens plate according to claim 16, wherein the second surfaces of the lenses of the first lens row are apart from each other.

18. A lens unit incorporating two lens plates, each lens plate comprising at least one lens row including a plurality of lenses aligned in a first direction, each lens including a lens surface that includes perimeter portions extending in a second direction substantially perpendicular to the first direction such that two adjacent lenses are contiguous with each other at the perimeter portions; the lens unit comprising:
- a light blocking member including openings that extends therethrough;
- wherein the two lens plates and the light blocking member are assembled together such that the optical axis of each lens passes through a corresponding one of the openings;
- wherein each of the openings includes fourth perimeter portions extending in a direction substantially perpendicular to a direction in which the lens row extends, and a fifth perimeter portion having a radius; and
- wherein each of the fourth perimeter portions is spaced apart by a first distance from the optical axis, the fifth perimeter portion is a part of a circumference having a radius, the fifth perimeter portion being located a second distance from the optical axis, the second distance being longer than the first distance.

19. A lens unit incorporating two lens plates, each lens plate comprising least one lens row including a plurality of lenses aligned in a first direction, each lens including a lens surface that includes perimeter portions extending in a second direction substantially perpendicular to the first direction such that two adjacent lenses are contiguous with each other at the perimeter portions; the lens unit comprising:
- a light blocking member including openings that extends therethrough;
- wherein the two lens plates and the light blocking member are assembled together such that the optical axis of each lens passes through a corresponding one of the openings;
- wherein the lens surface is a first surface, the lens has a second surface opposing the first surface, the second surface directly facing the light blocking member; and
- wherein the first surface includes a circumferential portion having a first radius and the second surface includes a circumferential perimeter portion having a second radius, the second radius being smaller than the first radius.

* * * * *